United States Patent
Kakehi et al.

(10) Patent No.: US 12,139,776 B2
(45) Date of Patent: Nov. 12, 2024

(54) HEAT-RESISTANT ALLOY, HEAT-RESISTANT ALLOY POWDER, HEAT-RESISTANT ALLOY STRUCTURAL COMPONENT, AND MANUFACTURING METHOD OF THE SAME

(71) Applicants: TOKYO METROPOLITAN PUBLIC UNIVERSITY CORPORATION, Tokyo (JP); NATIONAL UNIVERSITY CORPORATION HOKKAIDO UNIVERSITY, Sapporo (JP)

(72) Inventors: Koji Kakehi, Tokyo (JP); Shigenari Hayashi, Sapporo (JP); Yen-Ling Kuo, Sapporo (JP)

(73) Assignees: TOKYO METROPOLITAN PUBLIC UNIVERSITY CORPORATION, Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 0 days.

(21) Appl. No.: 18/384,449

(22) Filed: Oct. 27, 2023

(65) Prior Publication Data

US 2024/0076763 A1 Mar. 7, 2024

Related U.S. Application Data

(62) Division of application No. 17/764,880, filed as application No. PCT/JP2020/037543 on Oct. 2, 2020, now Pat. No. 11,846,006.

(30) Foreign Application Priority Data

Oct. 3, 2019 (JP) .................................. 2019-182842

(51) Int. Cl.
| | |
|---|---|
| C22C 19/05 | (2006.01) |
| B22F 1/00 | (2022.01) |
| B33Y 70/00 | (2020.01) |
| C22C 1/04 | (2023.01) |
| C22F 1/10 | (2006.01) |

(52) U.S. Cl.
CPC .............. *C22C 1/0433* (2013.01); *B22F 1/00* (2013.01); *B33Y 70/00* (2014.12); *C22C 19/056* (2013.01); *C22F 1/10* (2013.01)

(58) Field of Classification Search
CPC ................................. C22C 19/056; C22F 1/10
See application file for complete search history.

(56) References Cited

U.S. PATENT DOCUMENTS

| | | | |
|---|---|---|---|
| 5,294,239 A | 3/1994 | Zoltzer et al. | |
| 5,989,491 A | 11/1999 | Isomoto et al. | |
| 9,828,656 B2 | 11/2017 | Itoh et al. | |
| 2008/0279716 A1 | 11/2008 | Nishiyama et al. | |
| 2016/0160323 A1 | 6/2016 | Harada et al. | |
| 2017/0209923 A1 | 7/2017 | Giovannetti et al. | |
| 2019/0193149 A1 | 6/2019 | Kilmer et al. | |
| 2020/0370151 A1 | 11/2020 | Tomio et al. | |
| 2021/0162497 A1 | 6/2021 | Nakamura et al. | |

FOREIGN PATENT DOCUMENTS

| | | |
|---|---|---|
| CN | 101070570 A | 11/2007 |
| CN | 104308167 A | 1/2015 |
| CN | 106048309 A | 10/2016 |
| EP | 0 336 612 A1 | 10/1989 |
| EP | 1 717 330 A1 | 11/2006 |
| JP | S46-007855 A | 2/1971 |
| JP | S58-193335 A | 11/1983 |
| JP | S62-063626 A | 3/1987 |
| JP | H01-262048 A | 10/1989 |
| JP | H01-290731 A | 11/1989 |
| JP | H03-197633 A | 8/1991 |
| JP | H04-228533 A | 8/1992 |
| JP | H10-085804 A | 4/1998 |
| JP | H10-251785 A | 9/1998 |
| JP | H11-061303 A | 3/1999 |
| JP | 2003-027109 A | 1/2003 |
| JP | 2017-529453 A | 10/2017 |
| JP | 2018-083959 A | 5/2018 |
| JP | 2019-060006 A | 4/2019 |
| JP | 2019-112687 A | 7/2019 |
| WO | 2005/078148 A1 | 8/2005 |
| WO | 2015/020007 A1 | 2/2015 |
| WO | 2018/125313 A2 | 7/2018 |
| WO | 2019/124344 A1 | 6/2019 |
| WO | 2019/146504 A1 | 8/2019 |

OTHER PUBLICATIONS

Sato, A. et al., "Creep Strength of Yttrium Doped 4th Generation Ni-Base Single Crystal Superalloy", Journal of the Japan Institute of Metals and Materials, 2006, vol. 70, No. 4, pp. 380-383, with English translation, cited in specification. (9 pages).

Zhou, P. J. et al., "Influence of Y on stress rupture property of a Ni-based superalloy" Materials Science and Engineering A 551, 2012, pp. 236-240, cited in specification. (5 pages).

International Search Report dated Dec. 8, 2020, issued in counterpart International application No. PCT/JP2020/037543, with English translation. (11 pages).

(Continued)

*Primary Examiner* — Jessee R Roe

(74) *Attorney, Agent, or Firm* — WHDA, LLP

(57) ABSTRACT

A heat-resistant alloy contains Y, a content of Ni is a content of Ni is 58.0 mass % or greater, a content of Cr is 20.0 mass % or greater and 23.0 mass % or less, a content of Mo is 8.0 mass % or greater and 10.0 mass % or less, a content of Nb is 3.15 mass % or greater and 4.15 mass % or less, a content of O is 0.002 mass % or greater and 0.1 mass % or less, and a ratio of a content of Y in terms of mass to a content of O in terms of mass is 0.5 or greater and 100 or less.

5 Claims, 15 Drawing Sheets

(56) References Cited

OTHER PUBLICATIONS

International Preliminary Report on Patentability (Form PCT/IB/373) issued in counterpart International application No. PCT/JP2020/037543 mailed Sep. 13, 2021 with Form PCT/ISA/237. (8 pages).
Notification of Transmittal of Translation of the International Preliminary Report on Patentability (Form PCT/IB/338) issued in counterpart International Application No. PCT/JP2020/037543 mailed Apr. 7, 2022, with Forms PCT/IPEA/409. (8 pages).
King, D. et al, "Progress in Research on High Temperature Nickel Base Alloys by Laser Selective Melting", Aerospace Manufacturing, 2018, vol. 61, No. 10, pp. 49-67, with English translation, cited in CN Office Action dated Aug. 2, 2022. (46 pages).
Chen, W. et al, "Study on the Regulation and Tensile Properties of g-TiAl Micro-structure Fabricated by Electron Beam Augmentation", Aerospace Manufacturing, 2017, Issue 1/2, pp. 37-41, with English translation, cited in CN Office Action dated Aug. 2, 2022. (15 pages).
Office Action dated Aug. 2, 2022, issued in counterpart CN Application No. 202080068736.6, with English translation. (17 pages).
Office Action dated Jan. 11, 2023, issued in counterpart CN Application No. 202080068736.6, with English translation. (19 pages).
Zhuang, et al., "Deformed high-temperature alloy GH4169", Shoji Metallurgical Industry Publisher, 2006, pp. 8-10, with English translation. (10 pages).
Wang, et al., "Nickel-based cast high-temperature alloy", Guizhen Matallurgical Industry Press, 2014, pp. 97-102, with English translation (18 pages).
Office Action dated Apr. 4, 2023, issued in counterpart CN application No. 202080068736.6, with English translation. (10 pages).
Extended (Supplementary) Partial European Search Report dated Sep. 19, 2023, issued in counterpart EP application No. 20871968.2. (18 pages).
Dhanya, M.S. et al., "Processing and Characterization of Yttria-Dispersed INCONEL 718 ODS Alloy", Fundamentals of Petroleum and Petrochemical Engineering, Mar. 16, 2019, vol. 72, No. 6, pp. 1395-1398, cited in EP Extended European Search Report dated Sep. 19, 2023. (4 pages).
Kakehi et al., "Effect of yttrium addition on creep properties of a Ni-base superalloy built up by selective laser melting", Scripta Materialia, Elsevier, Amsterdam, NL, Mar. 27, 2020, vol. 183, pp. 71-74, cited in EP Extended European Search Report dated Sep. 19, 2023. (4pages).
Extended (Supplementary) European Search Report dated Dec. 20, 2023, issued in counterpart EP Application No. 20871968.2. (14 pages).

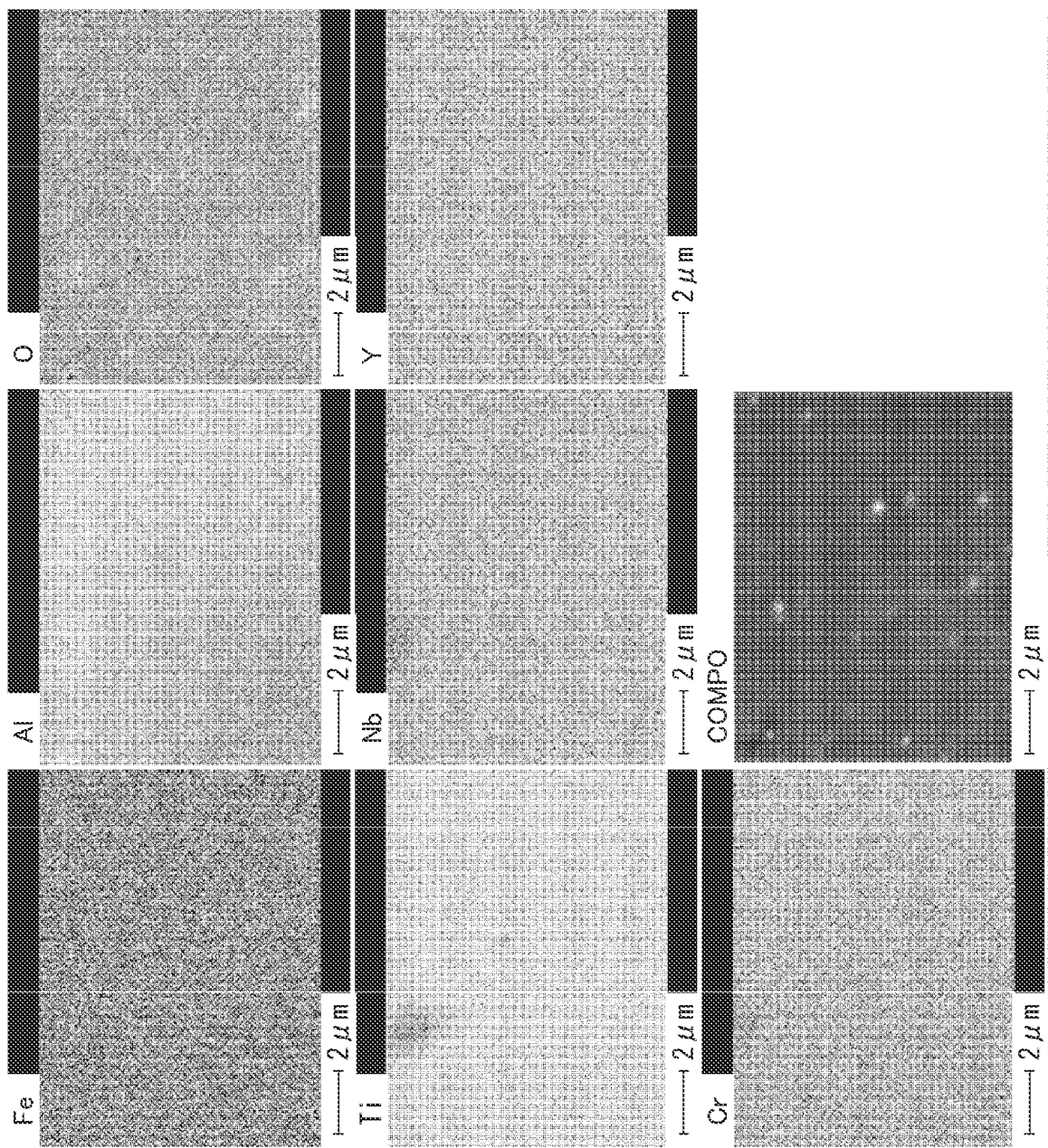
FIG. 13 EXAMPLE 6

HEAT-RESISTANT ALLOY, HEAT-RESISTANT ALLOY POWDER, HEAT-RESISTANT ALLOY STRUCTURAL COMPONENT, AND MANUFACTURING METHOD OF THE SAME

TECHNICAL FIELD

The present invention relates to a heat-resistant alloy, a heat-resistant alloy powder, a heat-resistant alloy structural component, and a manufacturing method of the same.

BACKGROUND ART

Heat-resistant alloys are used in aircraft engines and other applications. Additive manufacturing processes are known as processes for forming a structural component of the heat-resistant alloy (for example, Patent Document 1). It is known to disperse ceramic particles having Y (yttrium) or the like into crystal grains and grain boundaries in the alloy having columnar crystals (for example, Patent Document 2). It is known to add Y to nickel (Ni)-base alloys (for example, Non-Patent Documents 1 and 2).

PRIOR ART DOCUMENT

Patent Document

Patent Document 1: Japanese Patent Application Publication No. 2018-83959
Patent Document 2: Japanese Patent Application Publication No. 2019-60006

Non-Patent Document

Non-Patent Document 1: Journal of the Japan Institute of Metals and Materials, Volume 70, No. 4 (2006), pp. 380-383
Non-Patent Document 2: Materials Science and Engineering A 551 (2012), pp. 236-240

SUMMARY OF THE INVENTION

Problem to be Solved by the Invention

For example, a structural component of the alloy formed by additive manufacturing contains a large amount of oxygen (O). In the alloy containing a large amount of oxygen, the performance of the alloy may degrade. Patent Document 2, and Non-Patent Documents 1 and 2 describe the addition of Y to alloys, but do not describe the relationship with O.

The present invention has been made in view of above problems, and has an objective to improve the performance of the alloy by determining the ratio between oxygen and yttrium.

Means for Solving the Problem

The present invention is a heat-resistant alloy containing at least one element selected from a group consisting of Al, Ti, Ni, Cr, and Mo, O, and Y, wherein a ratio of a content of Y in terms of mass to a content of O in terms of mass is 0.5 or greater and 100 or less.

In the above configuration, a content of Ni may be 40.0 mass % or greater, and the content of O may be 0.002 mass % or greater and 0.1% mass or less.

In the above configuration, a content of Ni may be 50.0 mass % or greater and 55.0 mass % or less, a content of Cr may be 17.0 mass % or greater and 21.0 mass % or less, a content of Fe may be 11.0 mass % or greater and 25.0 mass % or less, a content of Mo may be 2.8 mass % or greater and 3.3 mass % or less, a content of Nb may be 4.75 mass % or greater and 5.50 mass % or less, a content of Al may be 0.20 mass % or greater and 0.80 mass % or less, a content of Ti may be 0.65 mass % or greater and 1.15 mass % or less, and the content of O may be 0.002 mass % or greater and 0.1 mass % or less.

In the above configuration, a content of Ni may be 58.0 mass % or greater, a content of Cr may be 20.0 mass % or greater and 23.0 mass % or less, a content of Mo may be 8.0 mass % or greater and 10.0 mass % or less, a content of Nb may be 3.15 mass % or greater and 4.15 mass % or less, and the content of O may be 0.002 mass % or greater and 0.1 mass % or less.

In the above configuration, a content of Ni may be 41.0 mass % or greater and 54.0 mass % or less, a content of Cr may be 20.5 mass % or greater and 23.0 mass % or less, a content of Mo may be 8.0 mass % or greater and 10.0 mass % or less, a content of Fe may be 17.0 mass % or greater and 20.0 mass % or less, a content of W may be 0.2 mass % or greater and 1.0 mass % or less, a content of Co may be 0.5 mass % or greater and 2.5 mass % or less, and the content of O may be 0.002 mass % or greater and 0.1 mass % or less.

In the above configuration, a content of Ti may be 50 mass % or greater, or the content of Ti may be 30 mass % or greater and a content of Al is 3 mass % or greater, and the content of O may be 0.05 mass % or greater and 1.0 mass % or less.

In the above configuration, a content of Ti may be 56.0 mass % or greater and 64.0 mass % or less, a content of Al may be 33.0 mass % or greater and 35.0 mass % or less, a content of Cr may be 2.2 mass % or greater and 2.7 mass % or less, a content of Nb may be 4.5 mass % or greater and 5.1 mass % or less, and a content of O may be 0.06 mass % or greater and 1.0 mass % or less.

In the above configuration, the ratio of the content of Y in terms of mass to the content of O in terms of mass may be 2.0 or greater and 43 or less.

In the above configuration, at least part of Y may be contained as yttria.

The present invention is a heat-resistant alloy powder containing the above heat-resistant alloy.

The present invention is a heat-resistant alloy structural component containing the above heat-resistant alloy.

The present invention is a manufacturing method of a heat-resistant alloy structural component including: forming a structural component by shaping the above heat-resistant alloy powder.

Effects of the Invention

The present invention can improve the performance of the alloy.

BRIEF DESCRIPTION OF THE DRAWINGS

FIG. 1A to FIG. 1C are images of the structural components of Example 1, and FIG. 1D to FIG. 1F are images of the structural components of Comparative example 1;

FIG. 13 presents element mapping using FE-EPMA of the spark plasma sintered (SPS) structural component in Example 6;

MODES FOR CARRYING OUT THE INVENTION

Figure 1A:
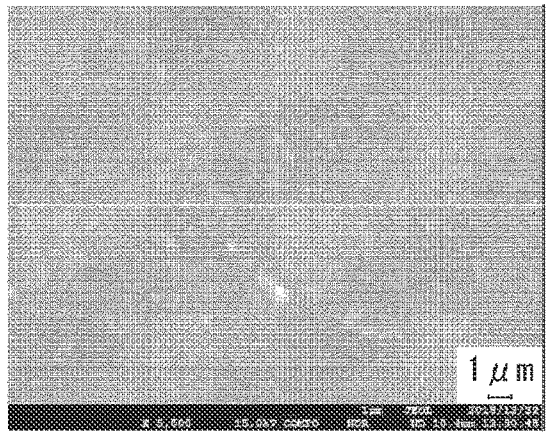
FIG. 1A to FIG. 1F present scanning electron microscope images of STA-treated specimens of structural components obtained in Example 1 and Comparative example 1.

Hereinafter, a detailed description will be given of an embodiment of the present invention. The heat-resistant alloy material of the present embodiment is a heat-resistant alloy material usable for additive manufacturing using a laser or an electron beam, and is characterized by containing a main component metal and Y. Hereinafter, this will be described in detail.

<Main Component Metal>

Examples of the main component metal include metal elements such as Ni, titanium (Ti), aluminum (Al), iron (Fe), chrome (Cr), cobalt (Co), niobium (Nb), copper (Cu), manganese (Mn), molybdenum (Mo), tantalum (Ta), tungsten (W), rhenium (Re), ruthenium (Ru), hafnium (Hf), and zirconium (Zr), and metal oxides such as NiO, TiO, $Al_2O_3$, and $Cr_2O_3$. They can be used alone or as a mixture of two or more of them. In the present embodiment, in particular, Ni, Ti, and Al, oxides of Ni, Ti, and Al (NiO, TiO, $Al_2O_3$), and a mixture thereof can be preferably used as the main component metal.

In a structural component made of the heat-resistant alloy material of the present embodiment, these main component metals, particularly metal oxides are preferably contained in the structural component as an oxidation resistance film or an oxide dispersion strengthening phase. The amount of each component in the main component metal is freely selected according to the composition. However, in the case that Ni is the main component, it is preferable to blend Ni so that 40 mass % or greater of Ni is contained in the entire alloy material. In the case that Al and Ti are main components without using Ni, it is preferable to blend Al and Ti so that the total content of Al and Ti in the entire heat-resistant alloy material is 50 mass % or greater, or even 90 mass % or greater, and 5 mass % or greater of Al and 5 mass % or greater of Ti are contained in the entire heat-resistant alloy material.

Each component used as the main component metal is preferably used in a form of particles (i.e., powder). The average particle size thereof is not particularly limited, and each component can be used in any desired particle size.

(Measurement Method of the Average Particle Size)

The average particle size can be obtained by visually measuring particle sizes observed using a transmission electron microscope and calculating the average of the measured particle sizes. Alternatively, the average particle size can be obtained by measuring the distribution densities of particles in the reflected electron image of the scanning electron microscope and calculating the average thereof.

<Yttrium (Y)>

Yttrium with a purity level of 99.9% or greater can be preferably used as Y, and as long as this purity level is satisfied, any commercially available metal Y can be used as an additive element without any restriction. In addition, Y preferably combines with O to be in a form of $Y_2O_3$ particles, and the particle size thereof is preferably 10 to 200 nm, more preferably 50 to 150 nm. The particle size in this case can be also obtained by the same method as the method described above.

In the additive manufacturing process using metal, metal powders are placed on a flat surface, and only the necessary parts are irradiated with a laser to be melt and solidified to build a component. In this process, there is a risk that residual oxygen on the surface of the powder will solidify and remain in the structural component, degrading the properties of the sintered material. Oxygen also has a problem that oxygen combines with Al, which is a strengthening element, to form alumina, consuming Al and deteriorating the high-temperature strength and oxidation resistance of the alloy. In this respect, yttrium (Y) more easily combines with oxygen than Al, forming a stable oxide ($Y_2O_3$). Therefore, in the additive manufacturing process using a laser, in which oxygen contamination is unavoidable, the inclusion of Y as an essential component can improve the heat resistance and oxidation resistance of the resulting structural component.

In addition, yttria ($Y_2O_3$), which is an oxide of Y, contributes to high-temperature strength as an oxide. However, the mechanical alloying method (a method of producing alloys by mechanically mixing metals in a solid state) using yttria particles has been applied in very limited use because of its extremely high cost and the impossibility of forming materials with complex shapes. However, in selective laser melting, the presence of solid solution oxygen makes it possible to form materials of complex shapes in which yttria particles, which are compounds of Y, are uniformly and finely dispersed at the density described later.

In addition, in casting processes (including forging processes in which casting is followed by forging) that undergo a special melting and refining process other than the additive manufacturing process using alloy powder, an oxygen amount is as low as 20 ppm or less. Therefore, when Y is added, Y does not combine with oxygen but combine with other alloy elements to form a detrimental topologically close packed (TCP) phase (see Non-Patent Document 1). Also in polycrystalline alloys, Y rarely combines with oxygen, but segregates and combines mainly with alloy elements to form detrimental compounds, and oxides of Y are formed non-uniformly and are not formed over the entire structural component (Non-Patent Document 2). However, by forming the alloy powder material containing Y as an additive element in advance into a structural component by additive manufacturing using a laser as described in the present embodiment, oxides of Y can be uniformly and finely distributed.

<Composition Ratio>

The main component metal and Y are preferably mixed so that 2 atoms of Y are present with respect to 3 atoms of mixed oxygen in the case that oxides of $Y_2O_3$ are contained in the structural component. More specifically, the composition ratio of Y in the entire alloy material is preferably adjusted to be 0.005 mass % or greater and less than 1.0 mass %, more preferably 0.01 to 0.5 mass %.

In the case of Ti alloys and TiAl alloys containing Ti and Al as the main component metals, the composition ratio of Y in the entire alloy material is preferably adjusted to be 0.01 mass % or greater and less than 1.0 mass %, more preferably 0.05 to 0.7 mass %, most preferably 0.1 to 0.5 mass %.

The composition ratio under the lower limit will not sufficiently improve the performance, and the addition of 0.5 mass % or greater will degrade the resulting structural component. Thus, the composition ratio is preferably adjusted to be within the above range. The reason for the difference in the effect obtained depending on the additive amount is because, in the case of additive manufacturing, it is difficult to remove the minute amount of oxygen even when the structural component is formed in vacuum, and unwanted oxides are formed during the additive manufacturing, reducing the heat resistance and the oxidation resistance, but inclusion of the above additive amount of Y causes $Y_2O_3$ to be formed earlier than oxides of other metal elements, decreases the amount of solid solution oxygen in Ti alloys and TiAl alloys, stabilizes the structure, prevents the embrittlement of the base material, and decreases the amount and size of the δ (delta) phase that is detrimental in the INCONEL (registered trademark) 718 alloy (hereinafter, IN718), resulting in increase in respective properties. Even in the consideration of the amount of oxygen, by adjusting the additive amount of Y to be within the above range, added Y is prevented from forming compounds with alloy elements, and effectively converts O to $Y_2O_3$.

Other Components

In the present embodiment, the heat-resistant alloy material can be mixed with additive elements that are typically used in this type of heat-resistant alloy material. Examples of the additive elements include, but are not limited to, carbon (C), silicon (Si), boron (B), Ta, Re, Ru, Hf, and Zr. Particularly, since Hf and Zr form more stable oxides than Al and Ti, Hf and Zr have the same effect as Y.

<Production Method of Heat-Resistant Alloy Material and Method of Using Heat-Resistant Alloy Material (Structural Component)>

The heat-resistant alloy material of the present embodiment can be used by mixing the above main component metal and Y using a publicly known method. Specifically, for example, powder of the heat-resistant alloy (the heat-resistant alloy material) can be obtained using the atomization method, which atomizes molten metal to which Y elements have been added, or other methods, and the resulting powder can be used as the heat-resistant alloy material for forming various kinds of structural components. The heat-resistant alloy material of the present invention can be suitably used in additive manufacturing processes, but this does not mean that it cannot be used in processes other than the additive manufacturing process, and can be applied to other processes such as hot isostatic pressing (HIP) processes and the like.

That is, the structural component of the present embodiment is a structural component obtained by laser or electron beam additive manufacturing using the powder of the heat-resistant alloy material of the present embodiment. The laser is emitted typically under the noble gas atmosphere such as argon (Ar) or the like, and the electron beam is emitted typically in vacuum.

Since the structural component of the present embodiment is formed using the above heat-resistant alloy material, the structural component is composed of the main component metal, oxides of the main component metal, and $Y_2O_3$, and $Y_2O_3$ is formed and dispersed over the entire structural component uniformly. The composition of these components can be qualitatively confirmed as shown in the examples below, but it cannot be quantitatively quantified or shown accurately. Therefore, it is appropriate to express it methodically as described above.

In addition, in the structural component of the present embodiment, $Y_2O_3$ particles and Y particles are preferably finely dispersed at a density of 30 particles/$\mu m^2$ or greater.

Here, the manufacturing method of the structural component of the present embodiment will be described in detail. The manufacturing method of the structural component of the present embodiment can be implemented by performing: a layer formation step in which powders of the above heat-resistant alloy material are uniformly dispersed and mixed, and then are atomized in predetermined locations in an additive manufacturing device to a predetermined thickness to form a powder layer of the heat-resistant alloy material, an irradiation step in which a predetermined position of the above powder layer is irradiated with a laser, a repetition step in which the layer formation step and the irradiation step are repeated, and a removal step in which unwanted powdered heat-resistant alloy material is removed finally.

Any typical methods used in mixing powders can be used for dispersing and mixing in the layer formation step without any limitation. In addition, the additive manufacturing device is not particularly limited, and may be any device that can melt and solidify powders by laser irradiation. Examples of the laser to be used include a high power Yb fiber laser. The above predetermined locations depend on the device, and mean the locations that can be irradiated with a laser in the device to be used. The predetermined thickness is freely selected depending on the power of the laser, but is preferably 20 to 50 μm to perform melting and solidification to the extent of achieving the desired effect.

For the irradiation condition of the laser in the irradiation step, the power of the laser is preferably 100 to 400 W, and the scanning speed is preferably 1 to 7 m/sec. The repetition step is performed until the structural component is completed. Preferable conditions for the laser irradiation and the layering are as follows.

Laser power: 200 W to 400 W
Laser irradiation diameter: 100 μm
Irradiation speed: <7 m/s
Layering pitch: 20 μm
Layering thickness: 40 μm In the above removal step, typical known methods such as sand blaster used in removing powders can be used without any limitation.

EXAMPLES

Hereinafter, the present embodiment will be described more specifically using examples and comparative examples, but the present invention is not limited to these examples.

Example 1

Example 1 is an example of the IN (INCONEL (registered trademark)) 718 alloy as a Ni-base alloy. The powder of the heat-resistant alloy material was prepared at the compositions presented in Table 1 below. The powder was prepared by means of typical gas atomization. The metal powders and other additives used were Y, Ni, Fe, Cr, Co, Al, Nb, Cu, Mn, Ti, Mo, C, and B. A structural component was fabricated from the heat-resistant alloy powder obtained by gas atomization. The structural component was fabricated using an additive manufacturing device that irradiates the powder with a laser. The structural component is an aggregated block with a thickness of 45 mm. After cutting out a specimen having parallel part dimensions of 19.6 mm×2.8 mm×3.0 mm from the block, the structural component was subjected to solution treatment and aging (STA). The processing conditions are as follows. Solution heat treatment was performed at 980° C. for 1 hour. After air cooling, first aging heat treatment was performed at 718° C. for 8 hours. After cooling in the heat treat furnace, second aging heat treatment was performed at 621° C. for 10 hours, and then air cooling was performed.

The cross-section of the resulting structural component was observed using a scanning electron microscope (SEM) and a transmission electron microscope (TEM). In addition, creep properties and oxidation properties were measured in the following conditions.

Creep properties: A creep test was conducted at a temperature of 650° C. with a stress of 550 MPa to determine the elongation with time.

Oxidation properties: An oxidation test was conducted at a temperature of 800° C. in air. The mass gain of the structural component with respect to the oxidation time was measured using an electronic balance.

Comparative Example 1

The heat-resistant alloy material was prepared in the same manner as in Example 1 except that Y was not added, and the structural component was fabricated. The resulting structural component was subjected to SEM observation to measure the creep properties and the oxidation properties in the same manner as in Example 1.

The compositions of the elements of the heat-resistant alloy powders in Example 1 and Comparative example 1 are listed in Table 1.

TABLE 1

| Composition | Example 1 (mass %) | Comparative example 1 (mass %) |
| --- | --- | --- |
| Y | 0.07 | — |
| Ni | 52.07 | 52.59 |
| Fe | Balance | Balance |
| Cr | 18.93 | 19.63 |
| Co | <0.01 | 0.03 |
| Al | 0.61 | 0.46 |
| Nb | 5.22 | 5.05 |
| Cu | <0.01 | 0.05 |
| Mn | 0.16 | 0.02 |
| Ti | 0.84 | 1.10 |
| Mo | 3.06 | 2.85 |
| C | 0.048 | 0.04 |
| Si | 0.16 | 0.02 |
| S | 0.001 | 0.004 |
| P | 0.002 | <0.010 |
| B | 50 ppm | 20 ppm |
| O | 70 ppm | 190 ppm |
| N | 75 ppm | — |

Figure 1B:
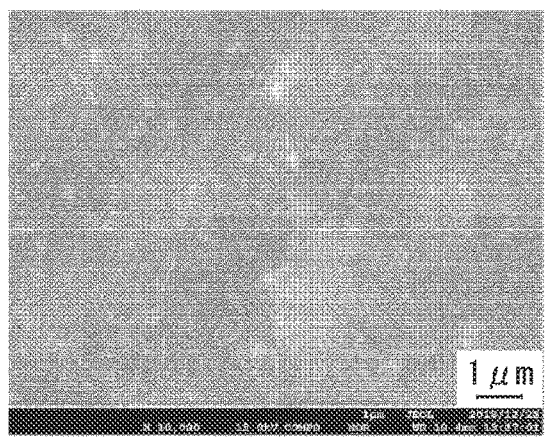
Figure 1C:
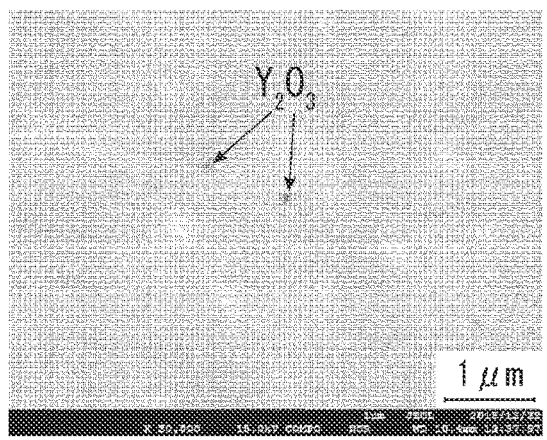
Figure 1D:
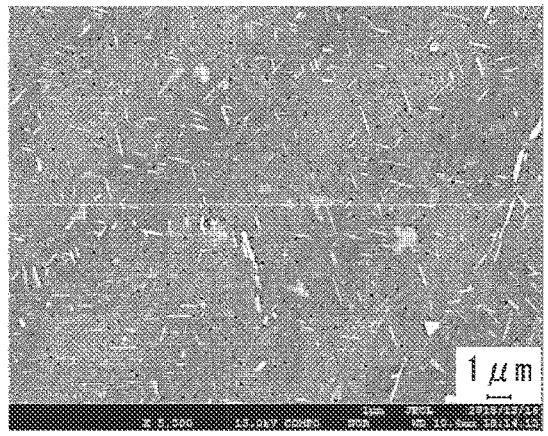
Figure 1E:
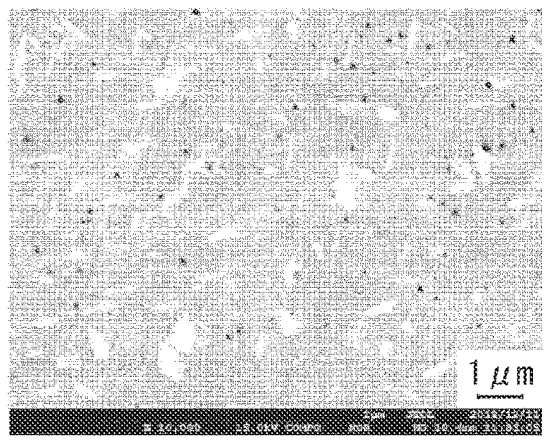
Figure 1F:
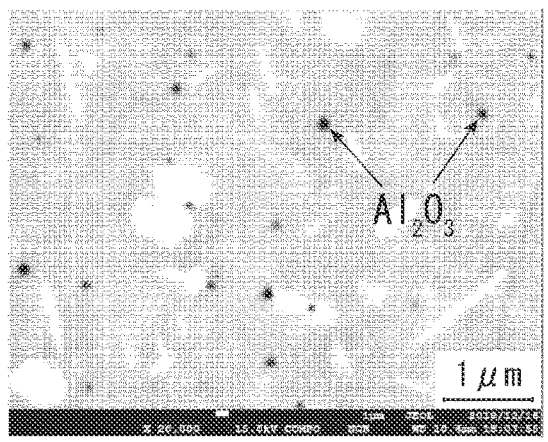

FIG. 1A to FIG. 1F present images of the SEM observation of specimens after STA treatment in Example 1 and Comparative example 1. FIG. 1A to FIG. 1C are SEM images of Example 1, and the magnification increases in the order of FIG. 1A to FIG. 1C. FIG. 1D to FIG. 1F are SEM images of Comparative example 1, and the magnification increases in the order of FIG. 1D to FIG. 1F. The magnifications of FIG. 1A to FIG. 1C are substantially equal to the magnifications of FIG. 1D to FIG. 1F, respectively.

Figure 2:
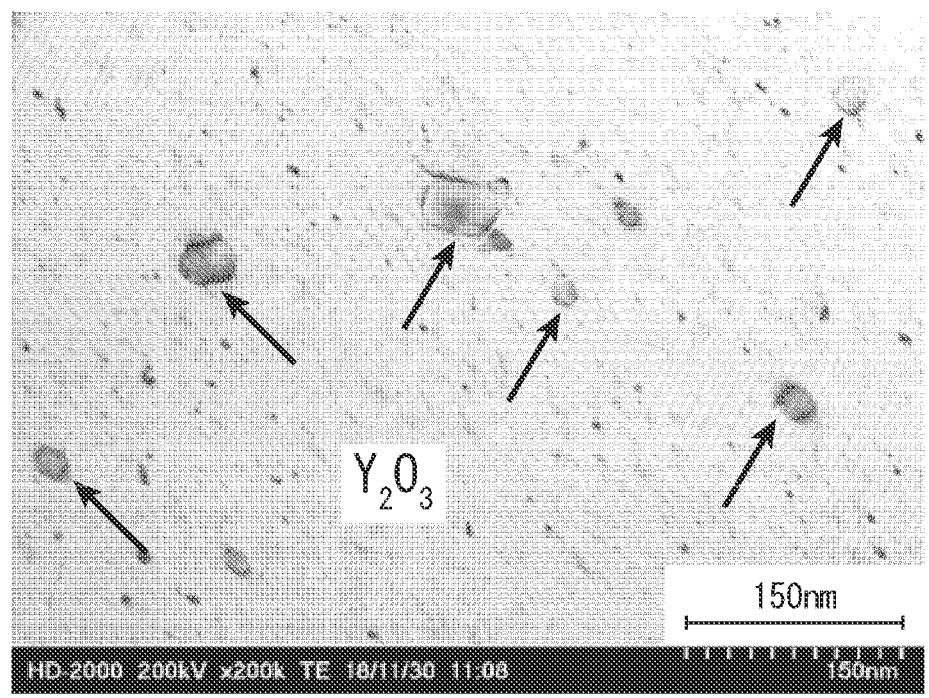
FIG. 2 is an image obtained by enlarging and observing $Y_2O_3$ particles in the specimen heat-treated using slowly cooling of the structural component obtained in Example 1 from 1180° C. to 1040° C. at 50° C./h.
Figure 3A:
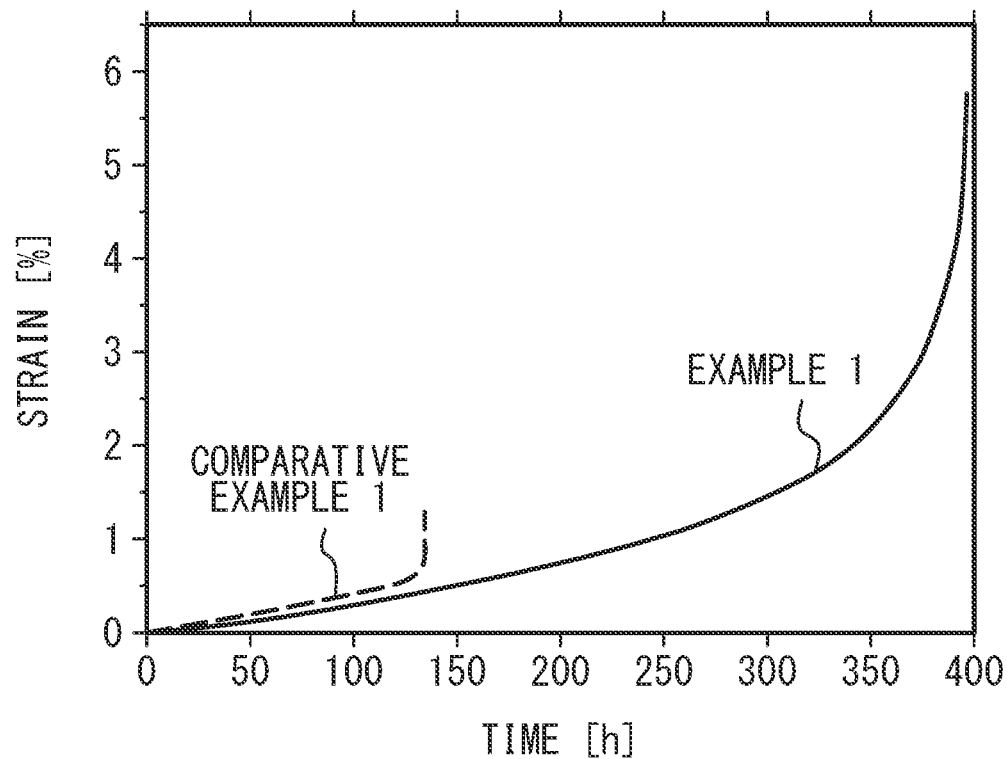
FIG. 3A and FIG. 3B are graphs presenting the creep properties and the oxidation properties of the structural components obtained in Example 1 and Comparative example 1, respectively.
Figure 3B:
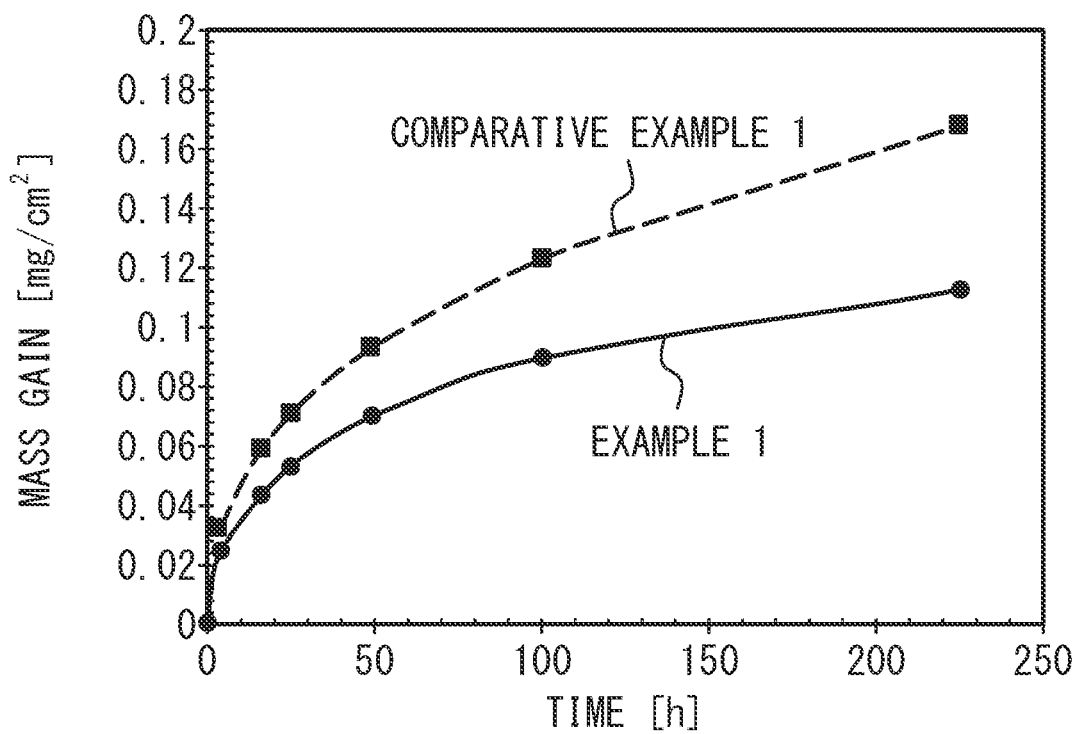

FIG. 2 presents the TEM observation image of the structural component in Example 1, and is the TEM image after the structural component was formed by additive manufacturing and was then subjected to heat treatment in which the structural component was slowly cooled from 1180° C. to 1040° C. at a cooling rate of 50° C./h (hour). FIG. 3A presents creep properties of STA-treated specimens of the structural components in Example 1 and Comparative example 1, and FIG. 3B presents the oxidation properties. FIG. 3A presents strain with respect to time, and FIG. 3B presents mass gain with respect to time. In FIG. 3B, dots indicate measurement points, and curves are approximate curves.

Speculations of Example 1

As clear from the results presented in FIG. 1A to FIG. 1F, in the structural component of Example 1 formed using the heat-resistant alloy material of the present embodiment, the density and the amount of the δ phase, which is a detrimental phase decreasing the strength, decrease, and oxides such as aluminum oxides are not formed unlike in the structural component of Comparative example 1. In addition, it can be seen that $Y_2O_3$, which improves various properties such as strength, is formed in a uniformly dispersed state in the structural component of Example 1.

As presented in FIG. 2, it can be seen that $Y_2O_3$ particles having clear outlines are formed because of slow cooling heat treatment from 1180° C. to 1040° C. at 50° C./h. In addition, as presented in FIG. 3A, in Comparative example 1, the rapture time indicating the creep life is 134 hours, and the strain at breaking point, which indicates the creep ductility, is 1.29%. In Example 1, the creep life is 396 hours, and the creep ductility is 5.76%. As presented in FIG. 3B, the mass gain due to oxidation in Example 1 is less than that in Comparative example 1. As described above, in Example 1, the creep life, the creep ductility, and the oxidation resistance were distinctively improved compared with those of Comparative example 1.

Example 2

Powders of the heat-resistant alloy material having compositions presented in Table 1 obtained in Example 1 and Comparative example 1 were vacuum-encapsulated in capsules made of stainless steel, and were subjected to hot isotropic pressurization (HIP) sintering at a temperature of 1180° C. and a pressure of 175 MPa for 4 hours to obtain a structural component. The SEM photos were taken of the resulting structural component to measure the creep properties as in the same manner as in Example 1.

Figure 4A:
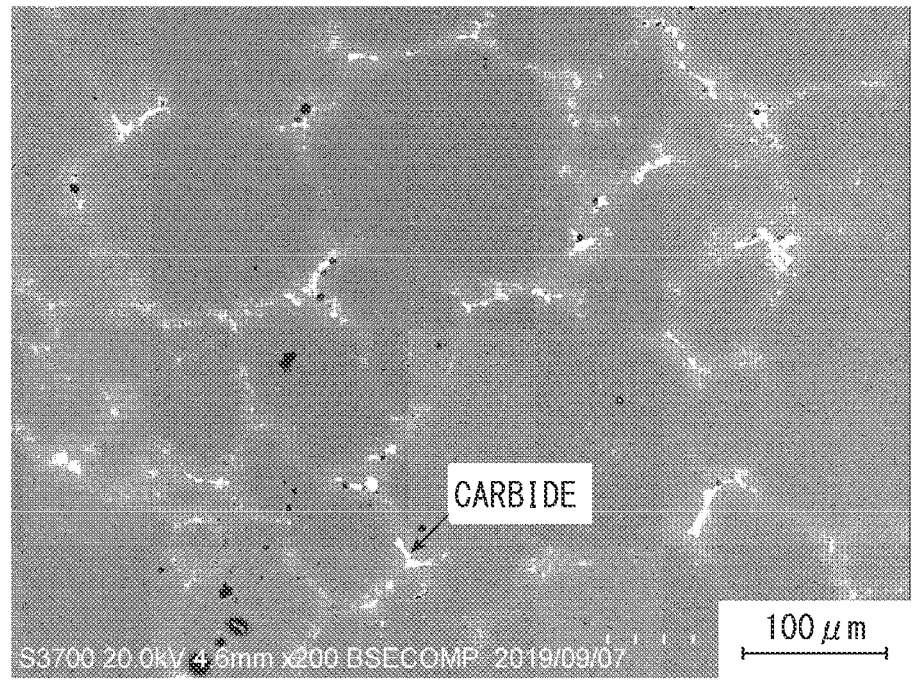
FIG. 4A and FIG. 4B are scanning electron microscope images of HIP-sintered structural components obtained in Example 2 and Comparative example 2, respectively.
Figure 4B:
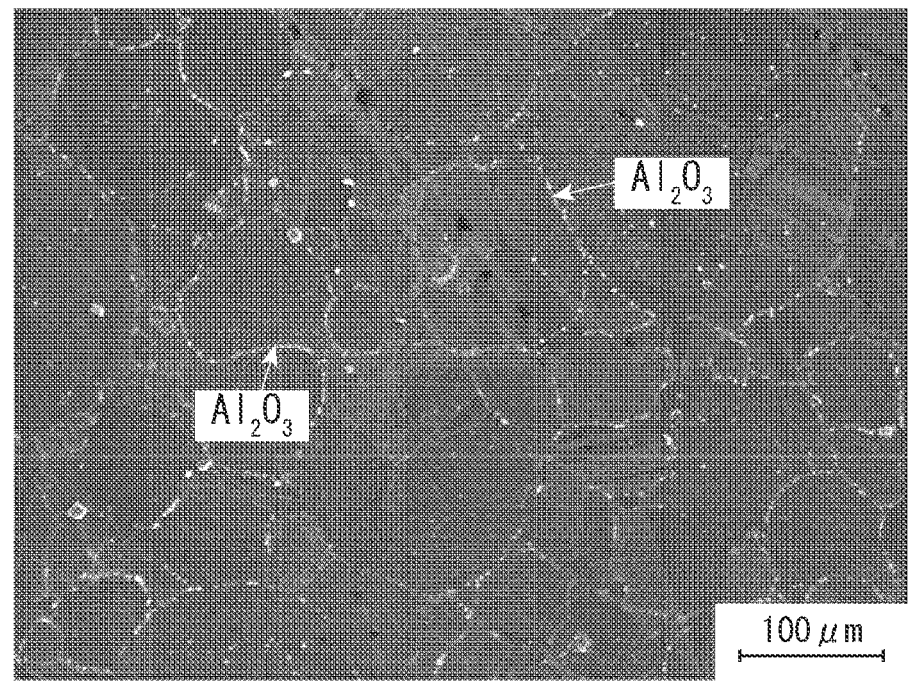
Figure 5:
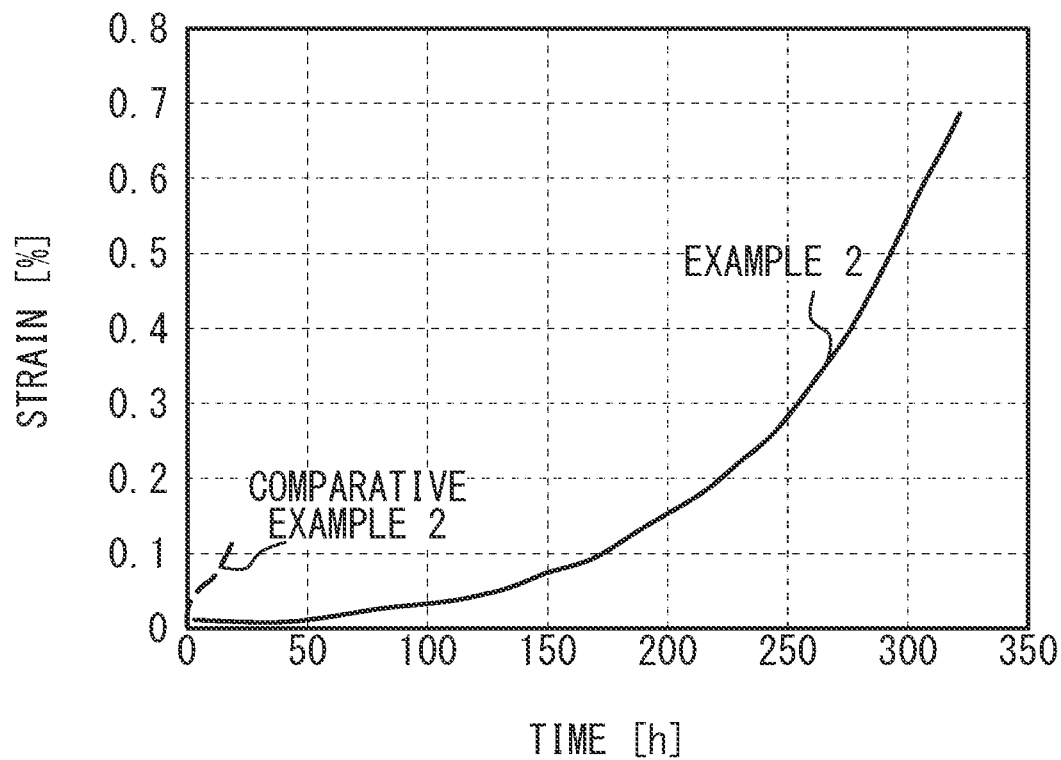
FIG. 5 is a graph presenting the creep properties of the HIP-sintered structural components obtained in Example 2 and Comparative example 2.

FIG. 4A and FIG. 4B present SEM images of the structural components in Example 2 and Comparative example 2, respectively. FIG. 5 presents creep properties of the structural components in Example 2 and Comparative example 2. As presented in FIG. 4A, in Example 2, white Laves phases and carbides are observed in the previous grain boundary face, but $Al_2O_3$ is not observed. By contrast, as presented in FIG. 4B, in Comparative example 2, white Laves phases and fine $Al_2O_3$ are observed along the prior grain boundary (PPB) interface. As presented in FIG. 5, in Comparative example 2, the creep life is 20.4 hours, and the creep ductility is 0.13%. In Example 2, the creep life is 322.5 hours, and the creep ductility is 0.68%. As seen from the above, it can be seen that in Example 2, the creep properties are improved compared with those in Comparative example 2.

In Comparative example 1, the long and thin bright regions in FIG. 1D to FIG. 1F are the δ phases ($Ni_3Nb$). The dark stippled region is $Al_2O_3$. In the IN718 alloy, the reaction formula in which the δ phase and the $Al_2O_3$ phase are formed is considered as follows.

$Ni_3(Al, Ti)+O \rightarrow Ni+Al_2O_3+TiO$  (Reaction formula 1)

$3Ni+Nb \rightarrow Ni_3Nb$ (the δ phase)  (Reaction formula 2)

In Example 1, as presented in FIG. 1A to FIG. 1C, the δ phase, which is bright, is rarely observed. It is found that mainly Y and O are present in the gray region in FIG. 1C from element mapping of field emission electron probe micro analysis (FE-EPMA). Therefore, the gray region is considered the $Y_2O_3$ phase.

The reason why the creep properties and the oxidation resistant performance were improved in Example 1 is considered because Y was contained in Example 1, and thereby, the reaction expressed by the reaction formula 1 was prevented, Y was oxidized instead, and $Y_2O_3$ was formed.

Figure 6:
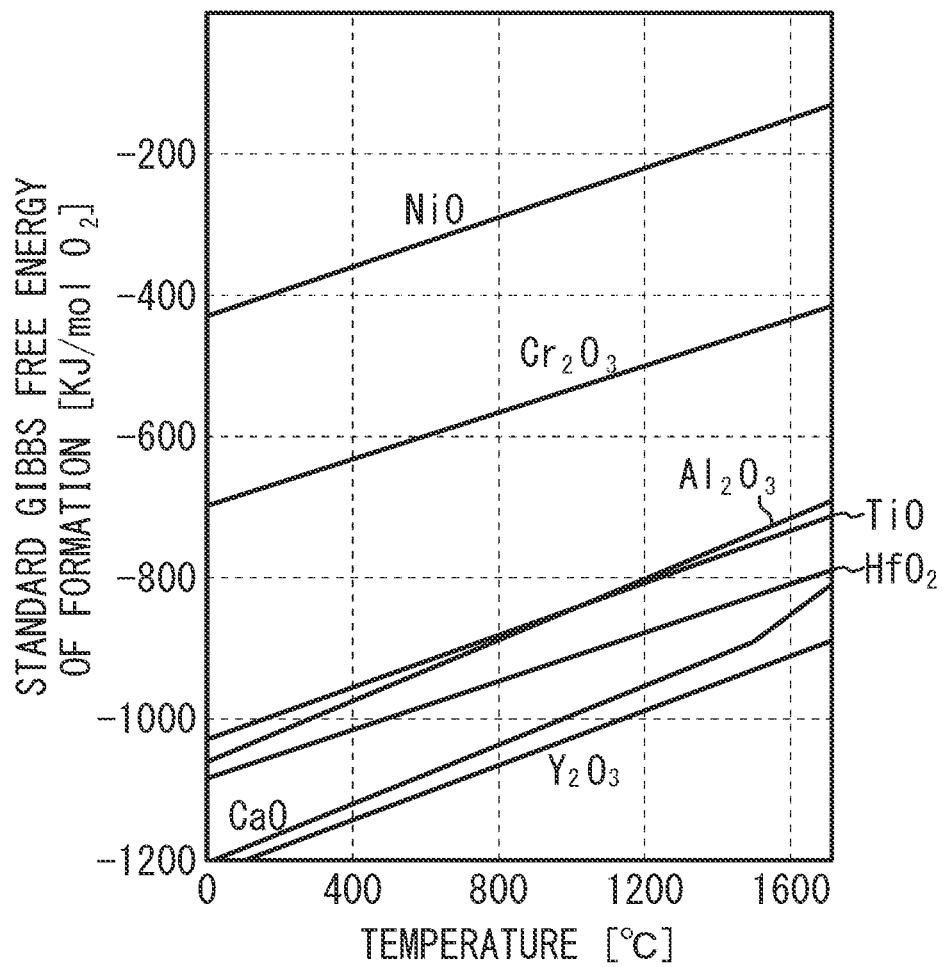
FIG. 6 is an Ellingham diagram of each oxide.

FIG. 6 is an Ellingham diagram of each oxide, and presents standard Gibbs free energy of formation with respect to temperature. As presented in FIG. 6, compared with the standard Gibbs free energies of formation of NiO, $Cr_2O_3$, $Al_2O_3$, and TiO, which are oxides of Ni, Cr, Al, and Ti, respectively, the standard Gibbs free energies of formation of CaO, $HfO_2$, and $Y_2O_3$, which are oxides of Ca, Hf, and Y, respectively, are low. In particular, the standard Gibbs free energy of formation of $Y_2O_3$ is the lowest. Therefore, O contained in the alloy is mainly used to oxidize Y, and is not used to oxidize Ni, Cr, Ti, or Al. This is considered the reason that the formation of the δ phase, which is a detrimental phase, is prevented, and the creep properties and the oxidation resistant performance improved in Example 1.

Example 3

To investigate the appropriate content of Y with respect to the content of O in the IN718 alloy, IN718 alloys having different contents of Y were prepared. The fabrication method of the structural component was the same as that of Example 1. The structural component was formed using the additive manufacturing method, and was then subjected to the STA treatment. As the additive manufacturing device, M280 made by the Electro Optical Systems (EOS) corporation was used. Table 2 lists the element compositions of the alloy powders in specimens A to E. The specimen A corresponds to Comparative example 1, and the specimen C corresponds to Example 1, the specimens B, D and E correspond to Example 3. The specimen B' is a structural component formed using the specimen B. Min and Max indicate the minimum value and the maximum value of the composition standard of the alloy, respectively. Bal. is an abbreviation for Balance and indicates the balance. The same applies to the lists presenting element compositions of the examples hereinafter. The Fe content was converted from the contents of other elements.

TABLE 2

| Specimen | | Y/O | Content [mass %] | | | | | | | |
|---|---|---|---|---|---|---|---|---|---|---|
| | | | Y | Ni | Cr | Fe | Mo | Nb | Al | Ti |
| A | Comparative example 1 | 0 | 0 | 52.59 | 19.63 | 18.4 | 2.85 | 5.05 | 0.46 | 1.10 |
| B | Example 3 | 5.2 | 0.026 | 52.45 | 18.87 | 18.7 | 3.02 | 5.11 | 0.60 | 0.87 |
| C | Example 1 | 10.0 | 0.07 | 52.07 | 18.93 | 18.8 | 3.06 | 5.22 | 0.61 | 0.84 |
| D | Example 3 | 45.7 | 0.32 | 52.44 | 19.28 | 17.9 | 3.09 | 5.10 | 0.63 | 0.91 |
| E | Example 3 | 40.8 | 0.58 | 52.56 | 19.13 | 17.2 | 3.08 | 5.13 | 0.63 | 0.86 |
| B' | After forming | 4.6 | 0.025 | 52.64 | 18.90 | 18.5 | 3.09 | 5.04 | 0.59 | 0.87 |
| | Min | — | — | 50.0 | 17.0 | Bal. | 2.8 | 4.75 | 0.20 | 0.65 |
| | Max | — | — | 55.0 | 21.0 | Bal. | 3.3 | 5.50 | 0.80 | 1.15 |

| Specimen | | Content [mass %] | | | | Content [ppm] | | |
|---|---|---|---|---|---|---|---|---|
| | | Cu | Mn | C | Si | B | O | N |
| A | Comparative example 1 | 0.05 | 0.02 | 0.040 | 0.02 | 20 | 190 | — |
| B | Example 3 | <0.01 | 0.15 | 0.046 | 0.14 | 44 | 50 | 50 |
| C | Example 1 | <0.01 | 0.16 | 0.048 | 0.16 | 56 | 70 | 75 |
| D | Example 3 | <0.01 | 0.14 | 0.050 | 0.14 | 40 | 70 | 50 |
| E | Example 3 | <0.01 | 0.14 | 0.050 | 0.16 | 40 | 142 | 54 |
| B' | After forming | 0.01 | 0.14 | 0.046 | 0.16 | 50 | 54 | 49 |
| | Min | — | — | — | — | — | — | — |
| | Max | 0.3 | 0.35 | 0.080 | 0.35 | 60 | — | — |

Y/O indicates the ratio of the content of yttrium in terms of mass to the content of oxygen in terms of mass. The theoretical value of Y/O in $Y_2O_3$ is 3.9. In the case that Y/O is the theoretical value 3.9, when all Y becomes $Y_2O_3$, most of O in the alloy is consumed by $Y_2O_3$. In the specimen A, which corresponds to Comparative example 1, Y/O is 0. In the specimen B, which corresponds to Example 3, Y/O is 5.2, substantially equal to the theoretical value. In the specimen C, which corresponds to Example 1, Y/O is 10.0, which is approximately three times the theoretical value, while in the specimen D, which corresponds to Example 3, Y/O is 45.7, which is approximately 10 times the theoretical value. In the specimen E, which corresponds to Example 3, the Y content is large, but the O content is also large. Therefore, Y/O is 40.8, which is approximately 10 times the theoretical value.

In the comparison between the specimen B and the specimen B', the content of each of the elements including O is almost the same between the powder and the structural component. This suggests that the content of each element in the powder is almost the same as that of the corresponding element in the structural component.

In each specimen, specimens for measuring the creep properties in the layering direction in the additive manufacturing process and the direction perpendicular to the layering direction were fabricated. The specimen of which the creep direction (the direction in which a stress is applied) is the layering direction is referred to as a layering direction specimen, while the specimen of which the creep direction is the direction perpendicular to the layering direction is referred to as a perpendicular direction specimen.

Figure 7A:
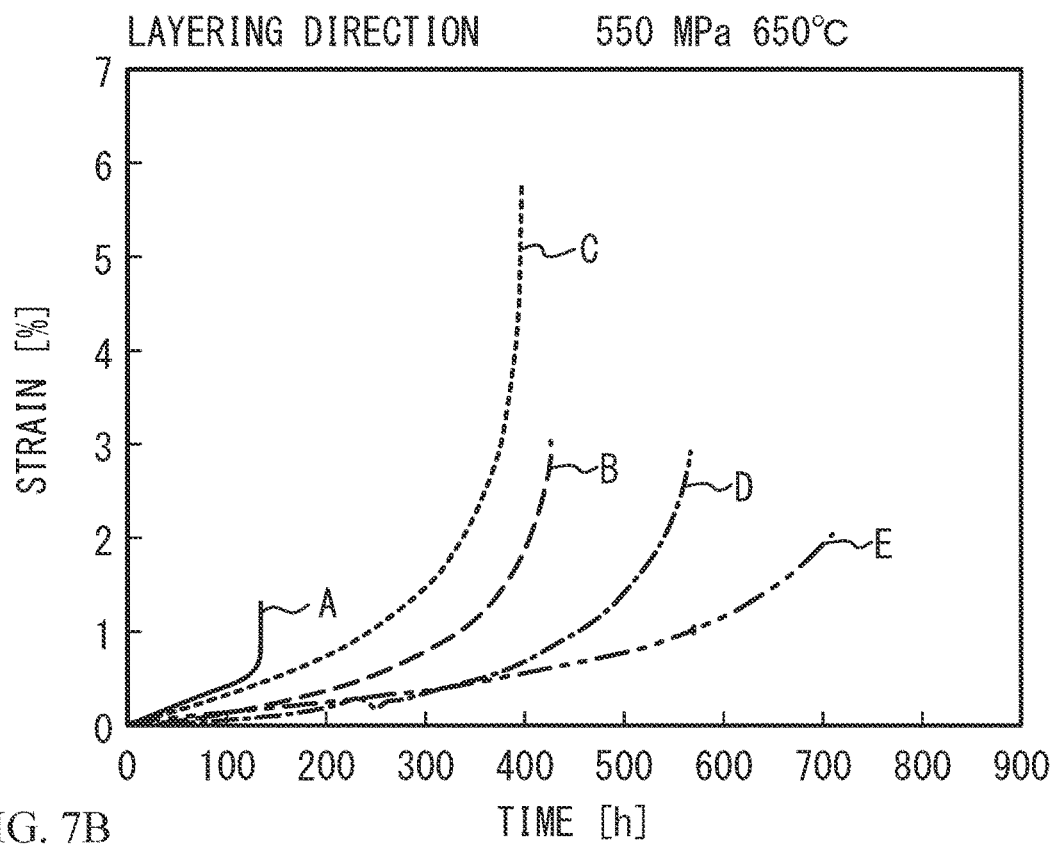
FIG. 7A presents the creep properties of a perpendicular direction specimen in Example 3.
Figure 7B:
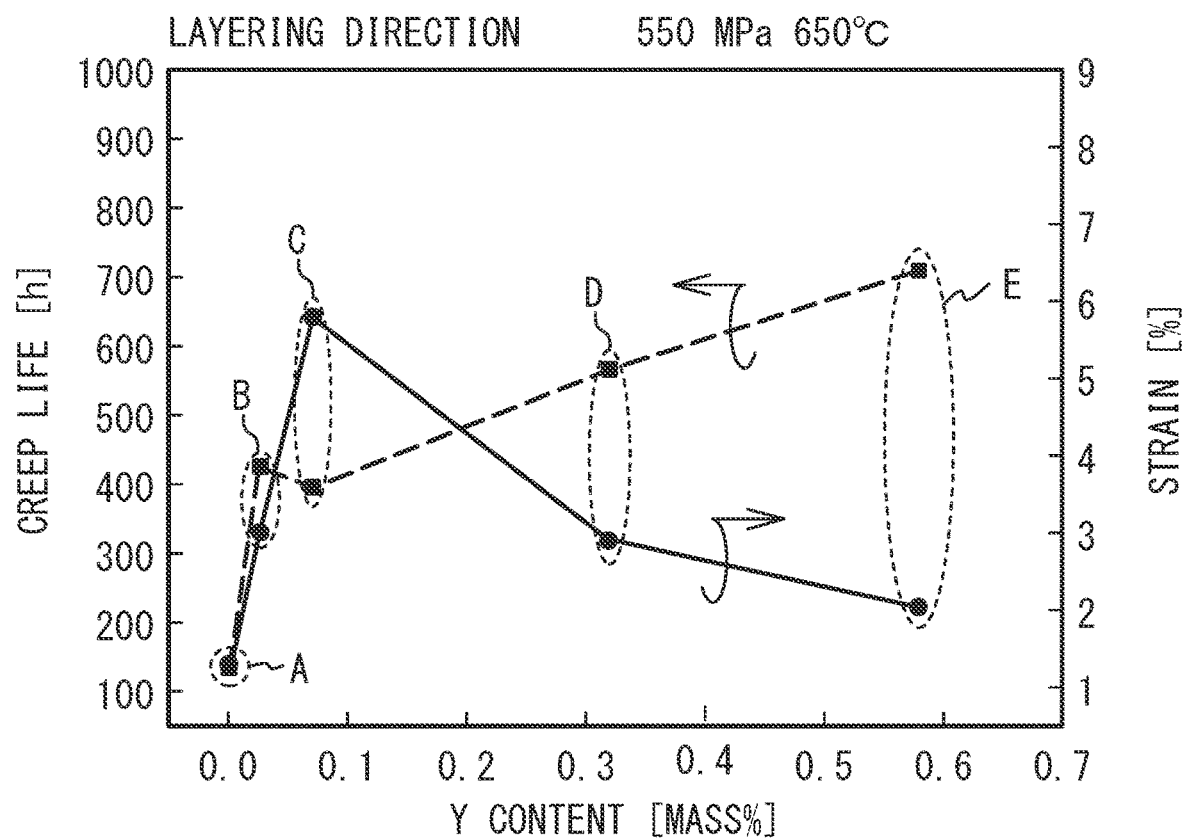
FIG. 7B is a graph of creep life and creep ductility versus Y content.

For each specimen, the creep properties when a stress of 550 MPa was applied at a temperature of 650° C. were measured in FIG. 7A to FIG. 8B. FIG. 7A presents the creep properties of the layering direction specimen in Example 3, and FIG. 7B presents the creep life and the creep ductility (the strain at breaking point) with respect to the Y content. As presented in FIG. 7A and FIG. 7B, as the content of Y increases, the creep life increases. The specimen C, of which the Y content is 0.07 mass %, has the largest creep ductility.

Figure 8A:
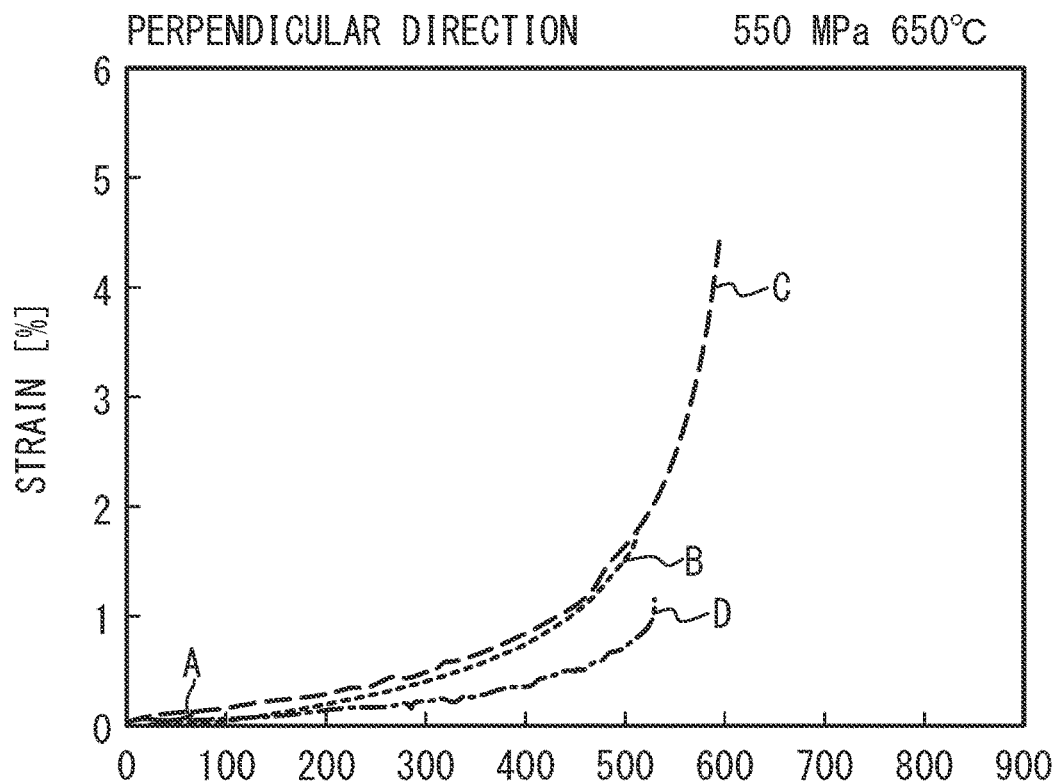
FIG. 8A presents the creep properties of a layering direction DA (direct-aged) specimen in Example 3.
Figure 8B:
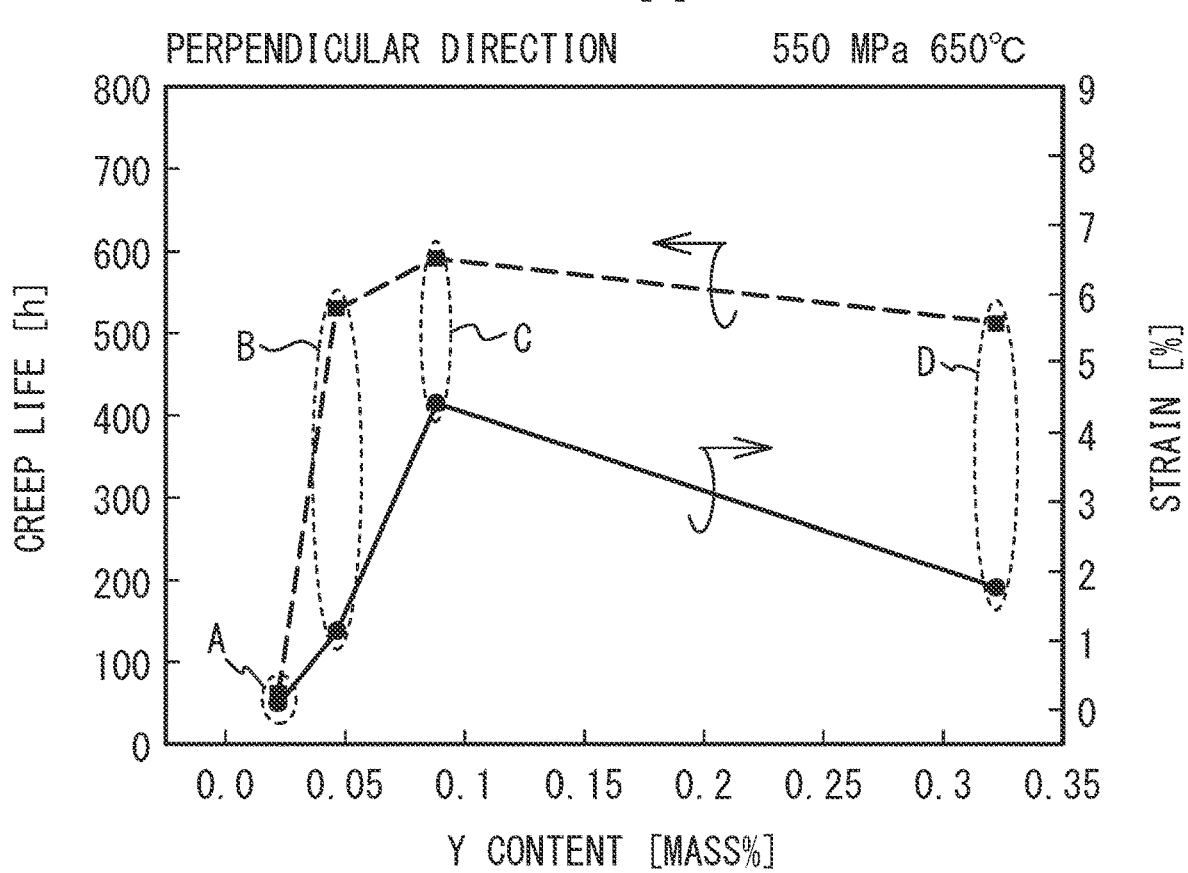
FIG. 8B is a graph of creep life and creep ductility versus Y content.

FIG. 8A presents the creep properties of the perpendicular direction specimen in Example 3, and FIG. 8B presents the creep life and the creep ductility (the strain at breaking point) with respect to the Y content. As presented in FIG. 8A and FIG. 8B, except the creep life in the layering direction, the specimen C with a Y content of 0.07 mass % has the longest creep life and the largest creep ductility.

As described above, except the creep life in the layering direction, the specimen C, of which Y/O is 10, has the longest creep life and the largest creep ductility. The creep life and the creep ductility of the specimen B, of which Y/O is 5.2, are not as large as those of the specimen C, but larger than those of the specimen A, which corresponds to Comparative example 1. The creep life and the creep ductility in the perpendicular direction and the creep ductility in the layering direction of the specimen D, of which Y/O is 45.7, are smaller than those of the specimen C, but larger than those of the specimen A. The specimen E has a Y content larger than that of the specimen D, but has Y/O approximately equal to that of the specimen D. The creep life and the creep ductility of the specimen E are not significantly different from those of the specimen D. As seen from the above, it is considered that Y/O rather than the Y content affects the creep properties.

Structural components were fabricated using powders of the specimens A and C by the HIP method. The structural component was fabricated by applying a pressure of 175 MPa at a temperature of 1180° C. for 4 hours. The structural component fabricated using the HIP method was subjected to the STA treatment. For the specimen after the fabrication using the HIP method and the specimen after the STA treatment, the stress-strain curve was measured at 650° C.

Figure 9:
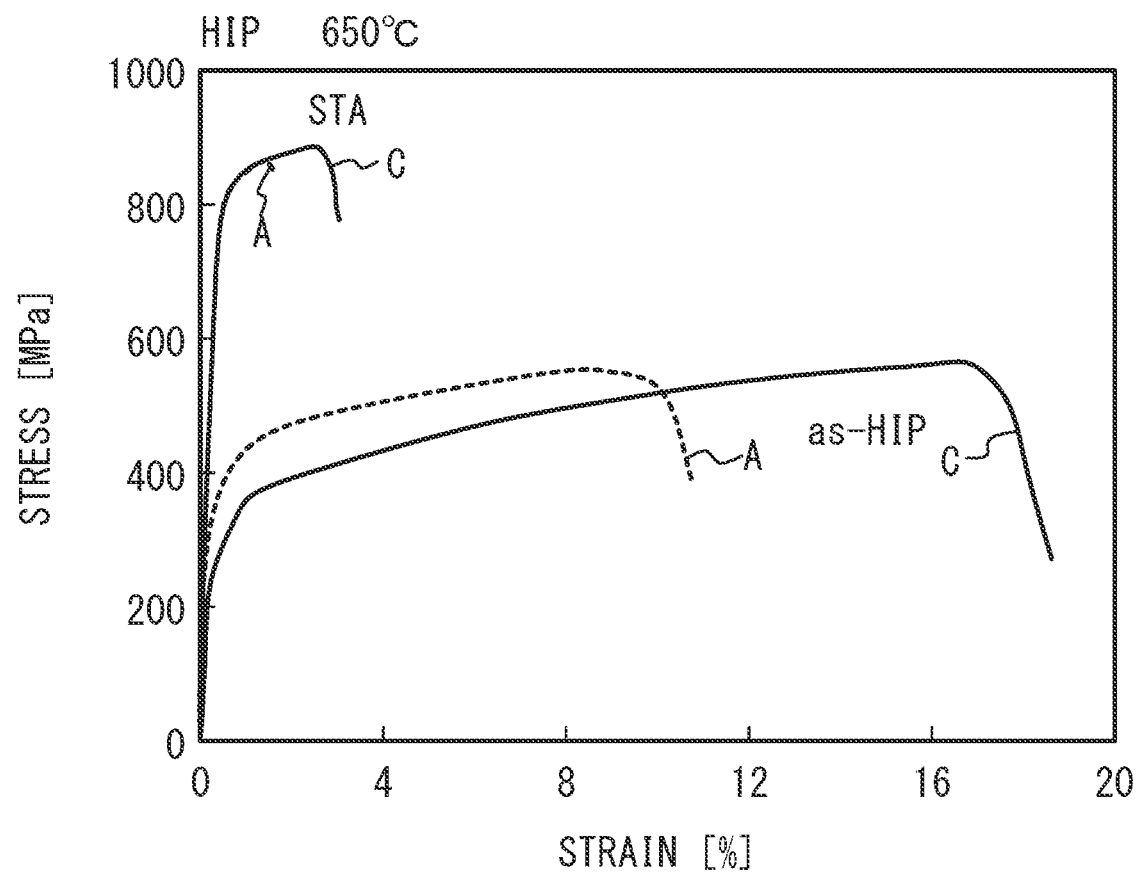
FIG. 9 presents stress-strain curves of HIP-sintered structural components in Example 3.

FIG. 9 presents stress-strain curves in Example 3. The test was conducted at a tensile strain rate of $4.25 \times 10^{-4}$ $s^{-1}$. In FIG. 9, as-HIP indicates the specimen immediately after the fabrication by the HIP, and STA indicates the specimen after the STA treatment. As presented in FIG. 9, in as-HIP, the specimen C has a lower proof stress than the specimen A but has a larger ductility than the specimen A. The STA treatment decreases the ductility of both the specimens A and C. The stress with which the specimen C is broken is high, and the ductility of the specimen C is also large. As seen from the above, the specimen C, of which Y/O is 10, has a larger ductility than the specimen A, which corresponds to Comparative example 1.

From the results of the FE-EPMA element mapping of the specimens B and D fabricated by additive manufacturing, the region where Al and O are present is observed in the specimen B, and it is considered that $Al_2O_3$ is present. In the specimen D, the region where Nb and Y are present is observed, and it is considered that the compound of Nb and Y is present. As seen from the above, in the specimen B, of which Y/O is the theoretical value, it is considered that oxygen to combine with Al is present, and the δ phase is also present. In the specimen D, of which Y/O is 10 times the theoretical value, it is considered that Y is excessive and reacts with Nb.

In the specimen C, of which Y/O is 10, approximately 3 times the theoretical value, it is considered that $Al_2O_3$ is little formed and the size and the amount of the δ phase decrease, and therefore creep properties are improved most.

Example 4

Example 4 is an example of the IN625 (INCONEL (registered trademark) 625 alloy (hereinafter, IN625)). The alloy powder was made using the atomization method, and the structural component was fabricated using the additive manufacturing method. M280 made by the EOS corporation was used as the additive manufacturing device. Thereafter, the STA treatment was conducted. The STA conditions are as follows. Heat treatment was conducted at 1120° C. (the specimen for the creep properties in FIG. 10A) or at 980° C. (the specimen for the stress-strain curves in FIG. 10B) for 1 hour. After air cooling, treatment at 718° C. was conducted for 8 hours. After cooling in the heat treat furnace, heat treatment at 621° C. was conducted for 10 hours, and then air cooling was conducted.

Table 3 lists element compositions in the alloy powder. In Example 4, Y/O is 2.53. Comparative example 4 does not contain Y.

TABLE 3

| | | | | Content [mass %] | | | | | |
|---|---|---|---|---|---|---|---|---|---|
| | Y/O | Y | Ni | Cr | Fe | Mo | Nb | Al | Ti |
| Comparative example 4 | 0 | 0 | 64.55 | 21.83 | 0.03 | 9.14 | 3.62 | 0.12 | 0.21 |
| Example 4 | 2.53 | 0.056 | 63.84 | 21.81 | 0.03 | 9.00 | 3.59 | 0.13 | 0.20 |
| Min | | — | 58.0 | 20.0 | — | 8.0 | 3.15 | — | — |
| Max | | — | Bal. | 23.0 | 5.00 | 10.0 | 4.15 | 0.40 | 0.40 |

| | Content [mass %] | | | | | Content [ppm] | |
|---|---|---|---|---|---|---|---|
| | Mn | C | Si | Co | S | O | N |
| Comparative example 4 | 0.24 | 0.004 | 0.23 | <0.01 | 0.002 | 180 | 42 |
| Example 4 | 0.24 | 0.006 | 0.22 | <0.01 | 0.002 | 257 | 46 |
| Min | — | — | — | — | — | — | — |
| Max | 0.5 | 0.1 | 0.5 | 1.0 | 0.015 | — | — |

For Example 4 and Comparative example 4, the creep properties in the layering direction were measured. The measurement was conducted with a stress of 550 MPa at a temperature of 650° C. In addition, the stress-strain curve was measured. The measurement temperature was 650° C.

Figure 10A:
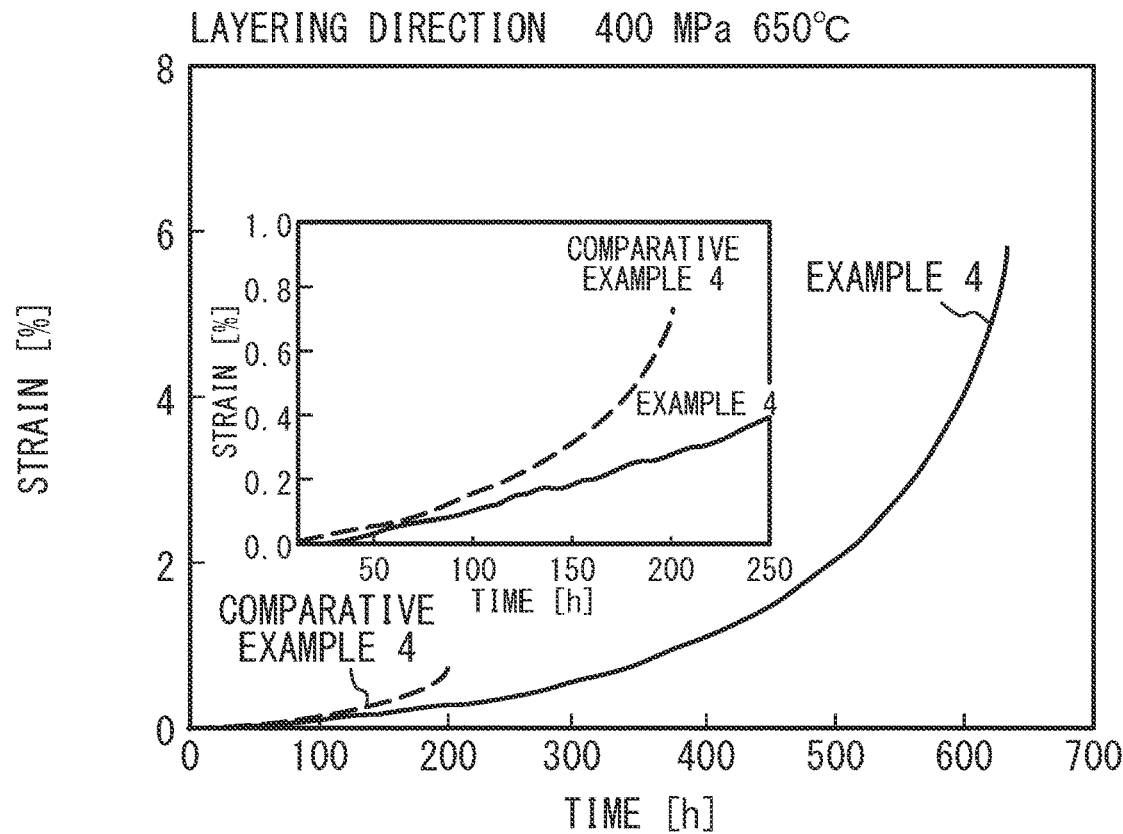
FIG. 10A presents creep properties in Example 4 and Comparative example 4.
Figure 10B:
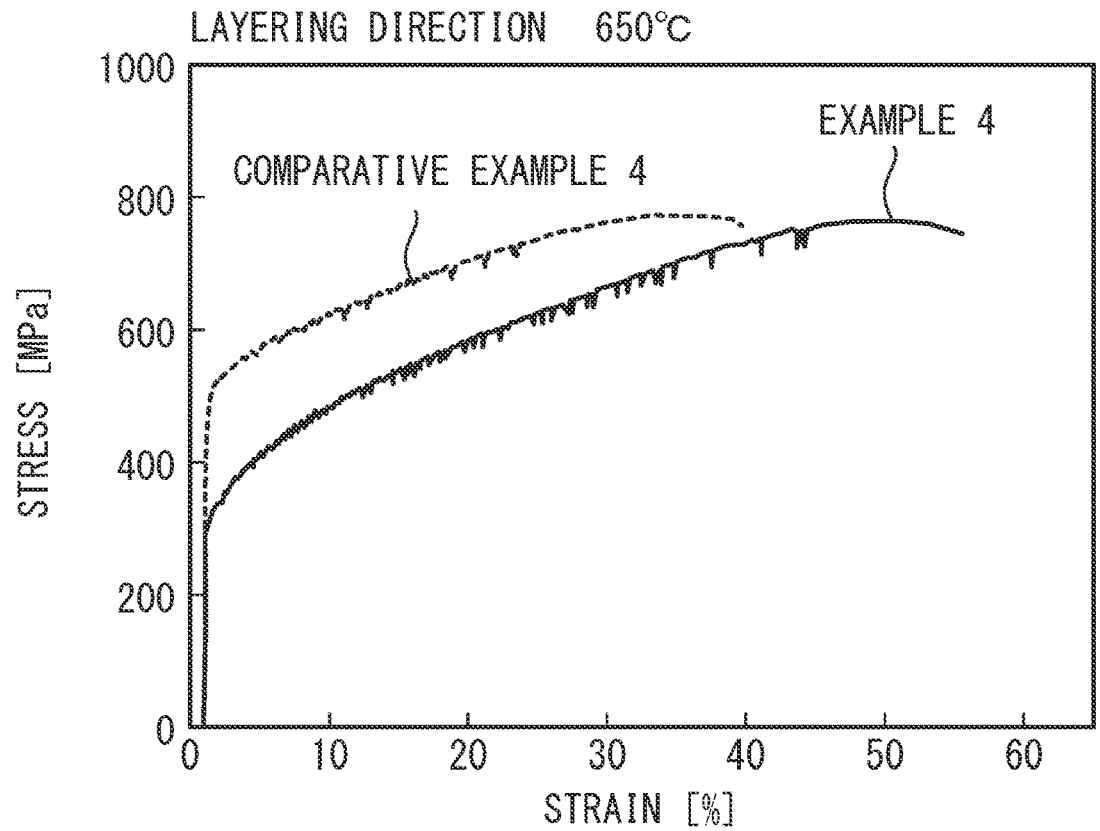
FIG. 10B presents stress-strain curves.

FIG. 10A presents the creep properties in Example 4 and Comparative example 4, and FIG. 10B presents the stress-strain curves. As presented in FIG. 10A, Example 4 has a longer creep life and a larger creep ductility than the Comparative example 4. As presented in FIG. 10B, Example 4 has a lower proof stress than Comparative example 4, but a larger ductility than Comparative example 4. The reason why the proof stress decreases in Example 4 is considered because the size and the amount of the δ phase decrease. As seen from the above, Example 4 has more improved creep properties and more improved ductility than Comparative example 4.

Example 5

Example 5 is an example of a Ni-base alloy HASTELLOY (registered trademark) X containing Cr and Mo. The alloy powder was made using the atomization method, and the structural component was fabricated using the additive manufacturing method. M290 made by the EOS corporation was used as the additive manufacturing device. Solution treatment (ST) was conducted at a temperature of 1177° C. for 2 hours as heat treatment.

Table 4 lists element compositions in the alloy powder. In Example 5, Y/O is 3.9. Comparative example 5 does not contain Y. The content rate of Ni was converted from the content rates of other elements.

TABLE 4

| | | | | Content [mass %] | | | | | |
|---|---|---|---|---|---|---|---|---|---|
| | Y/O | Y | Ni | Cr | Fe | Mo | Nb | Al | Ti |
| Comparative example 5 | 0 | 0 | 48.2 | 22.49 | 18.11 | 9.04 | <0.01 | <0.01 | <0.01 |
| Example 5 | 3.90 | 0.048 | 48.3 | 22.28 | 18.29 | 8.76 | <0.01 | <0.01 | <0.01 |
| Min | | — | Bal. | 20.5 | 17.0 | 8.0 | — | — | — |
| Max | | — | Bal. | 23.0 | 20.0 | 10.0 | — | 0.50 | 0.15 |

| | Content [mass %] | | | | Content [ppm] | |
|---|---|---|---|---|---|---|
| | C | Si | Co | W | O | N |
| Comparative example 5 | 0.063 | <0.01 | 1.54 | 0.57 | 127 | 62 |
| Example 5 | 0.082 | <0.01 | 1.56 | 0.60 | 123 | 63 |
| Min | — | — | 0.5 | 0.2 | — | — |
| Max | 0.1 | 1.0 | 2.5 | 1.0 | — | — |

For Example 5 and Comparative example 5, the creep properties of specimens after the formation and specimens after the ST treatment were measured. The measurement was conducted with a stress of 80 MPa at a temperature of 900° C. The specimen of Example 5 after the forming was subjected to the element mapping using the energy dispersive X-ray spectroscopy (EDS). The region where Y and O are unevenly distributed was observed. This reveals that the $Y_2O_3$ phase is present.

Figure 11A:
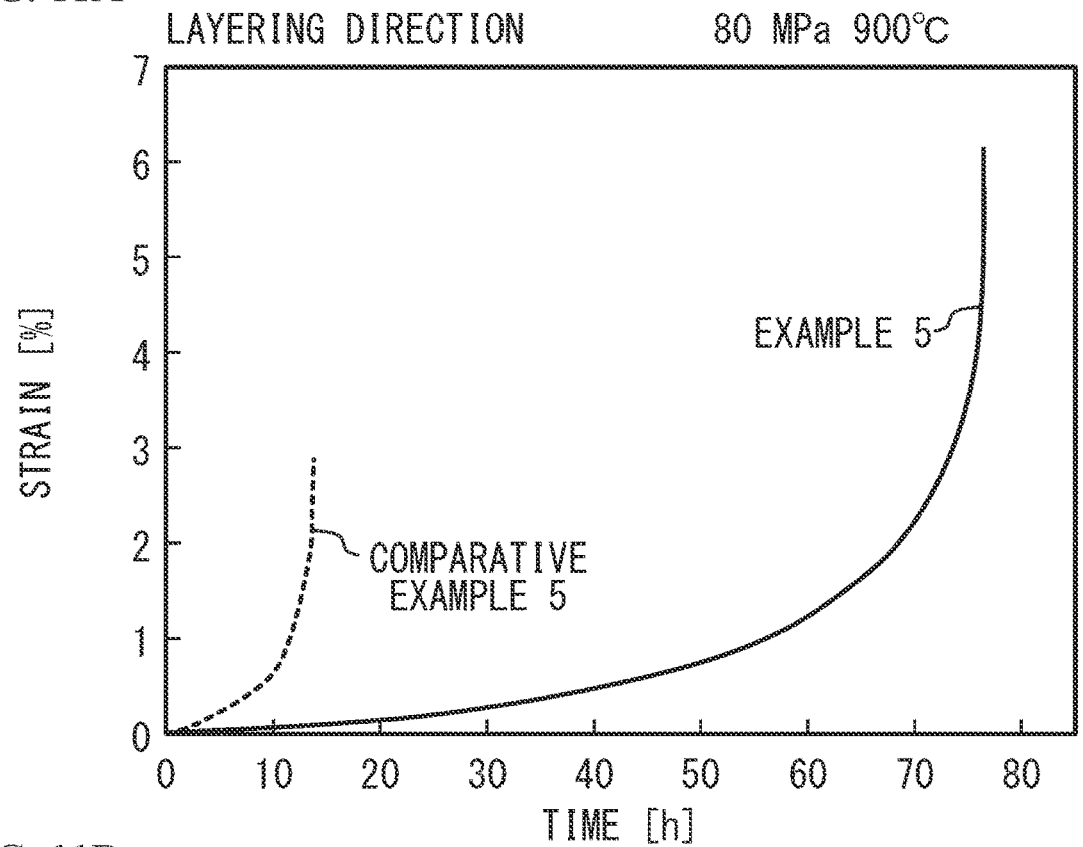
FIG. 11A and FIG. 11B present creep properties in the perpendicular direction and the layering direction after formation of Example 5 and Comparative example 5.
Figure 11B:
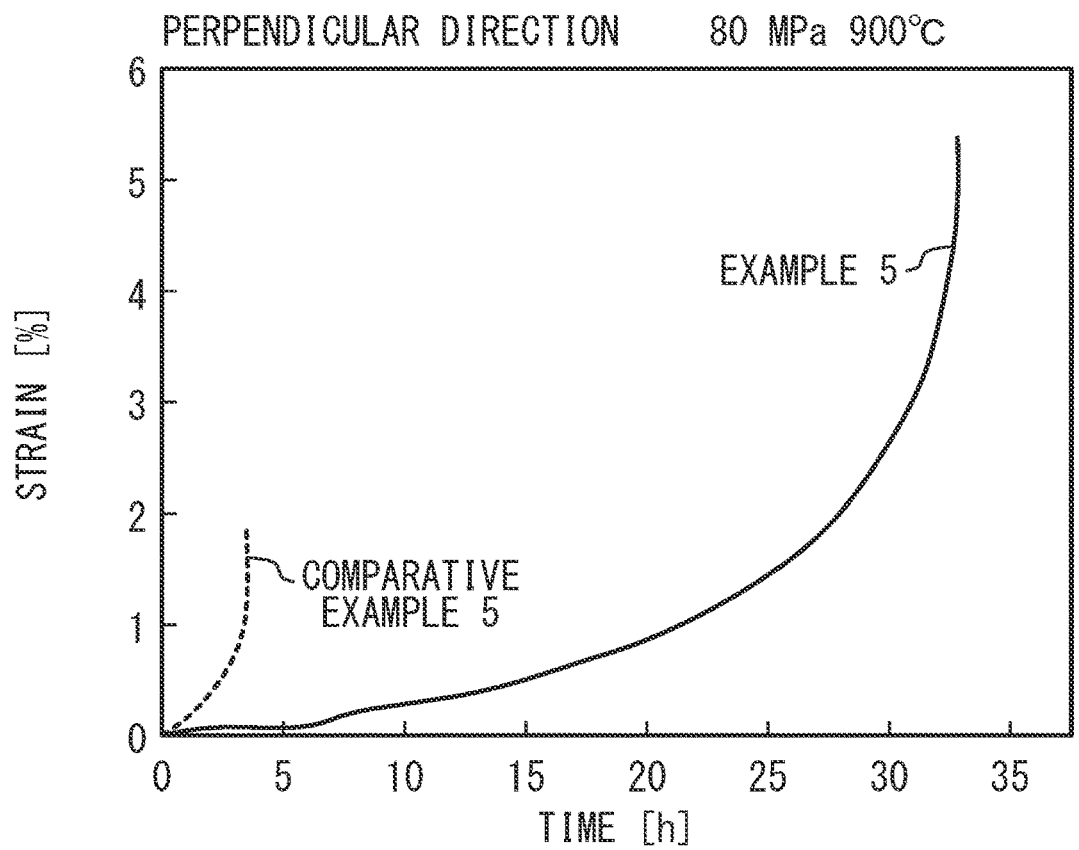
Figure 12A:
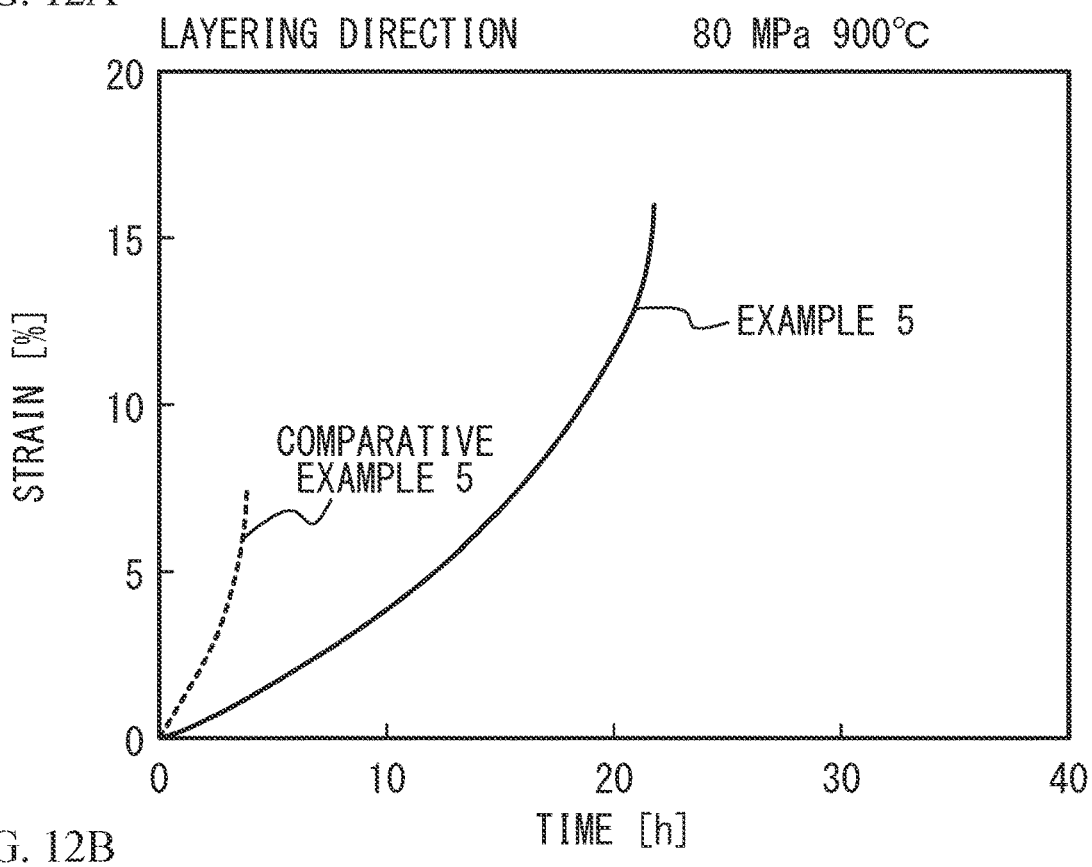
FIG. 12A and FIG. 12B present creep properties in the perpendicular direction and the layering direction after solution-treated (ST) treatment of Example 5 and Comparative example 5.
Figure 12B:
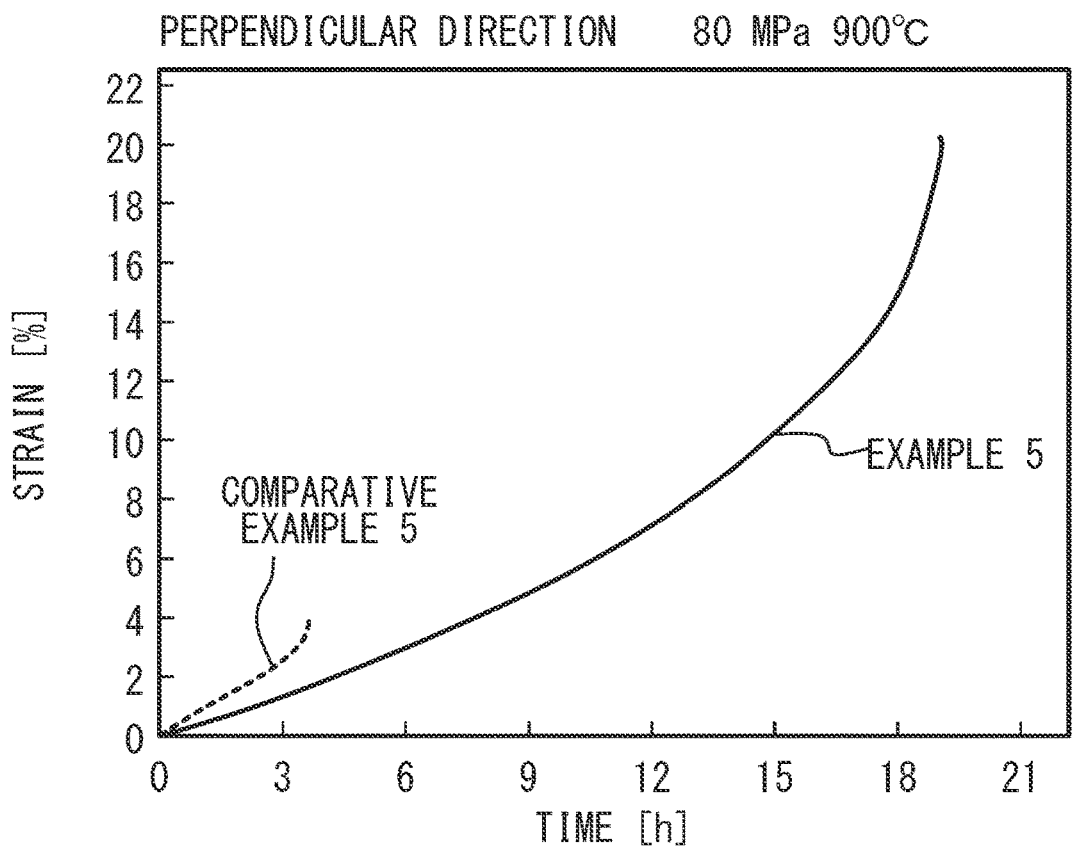

FIG. 11A and FIG. 11B present the creep properties in the layering direction and the perpendicular direction after the formation of Example 5 and Comparative example 5, respectively. FIG. 12A and FIG. 12B present the creep properties in the layering direction and the perpendicular direction after the ST treatment of Example 5 and Comparative example 5, respectively.

As presented in FIG. 11A to FIG. 12B, both after the fabrication of the structural component and after the ST treatment, both in the layering direction and the perpendicular direction, Example 5 has a longer creep life and a larger creep ductility than Comparative example 5. As seen from the above, Example 5 has improved creep properties compared with Comparative example 5. As in Example 5, even in the solid-solution strengthening alloy containing none of Nb, Al, and Ti, addition of Y improves the creep properties.

Example 6

Example 6 is an example of the TiAl4822 alloy as an TiAl alloy. The alloy powder was made using the atomization method, and the structural component was fabricated using the spark plasma sintering (SPS) method. The SPS method is a method that sinters a workpiece in vacuum by mechanical pressurization and pulsed electric heating. Thereafter, heat treatment was conducted. The conditions are as follows. A welding pressure of 50 MPa and a temperature of 1075° C. were kept for 10 minutes in the SPS method. After heat treatment in vacuum at a temperature of 1205° C. was conducted for 5 hours, homogeneous heat treatment for furnace cooling was conducted in the heat treatment.

Table 5 lists element compositions in the alloy powder. In Example 6, Y/O is 2.63. In Comparative example 6, Y is not contained. The content rate of Ti was converted from the content rates of other elements.

TiAl alloy prevents Ti and O from segregating, therefore improving the textural stability.

Summary of Examples

By manufacturing the alloy using the cast & wrought (C&W) method, the casting method, and the forging method, the oxygen concentration can be decreased. However, it is difficult to manufacture a structural component with a complex shape using these methods. A structural component of the alloy is formed using the additive manufacturing method such as the selective laser melting (SLM) method using a laser beam and the electron beam melting (EBM) method using an electron beam, the hot isostatic pressing (HIP) method, the powder bed fusion (PBF) method, and the direct energy deposition (DED) method. This allows for the manufacturing of a structural component with a complex shape. These methods form a structural component from alloy powder. Since the alloy powder has a large specific surface area, oxygen is easily incorporated into the alloy. As a result, oxygen is also more likely to be contained in the structural component formed from the alloy powder.

The structural component other than the structural component formed from the heat-resistant alloy powder may contain a lot of oxygen. Such heat-resistant alloy structural components deteriorate in performances such as creep properties. As in Comparative examples 1 to 6, in the heat-resistant alloy containing at least one element selected from a group consisting of Al, Ti, Ni, Cr, and Mo, oxidation of these elements forms a detrimental phase and deteriorates the performance of the alloy. Thus, as presented in FIG. 6, Y, oxides of which have a lower standard Gibbs free energy of formation than Al, Ti, Ni, Cr, and Mo, is added to the alloy. The ratio Y/O, which is the ratio of the content of Y in terms of mass to the content of O in terms of mass, in the stoichiometric composition ratio of yttria ($Y_2O_3$) is 3.9. Thus, Y/O is adjusted to be 0.5 or greater and 100 or less. Oxidation of at least one of Al, Ti, Ni, Cr, and Mo can be prevented. Therefore, performances, such as creep properties, of the heat-resistant alloy can be improved.

To reduce the detrimental phase, Y/O is preferably 1.0 or greater, more preferably 2.6 or greater, further preferably 3.9

TABLE 5

| | | Content [mass %] | | | | | | | Content [ppm] | |
|---|---|---|---|---|---|---|---|---|---|---|
| | Y/O | Y | Ti | Al | Cr | Nb | Fe | C | O | N |
| Comparative example 6 | 0 | 0 | 57.5 | 34.7 | 2.46 | 5.31 | 0.05 | 0.007 | 700 | 10 |
| Example 6 | 2.63 | 0.21 | 57.3 | 34.8 | 2.43 | 5.17 | 0.05 | 0.007 | 800 | 20 |
| Min | — | — | Bal. | 33.0 | 2.2 | 4.5 | — | — | — | — |
| Max | — | — | Bal. | 35.0 | 2.7 | 5.1 | 0.1 | 0.02 | 1200 | 300 |

Figure 14:
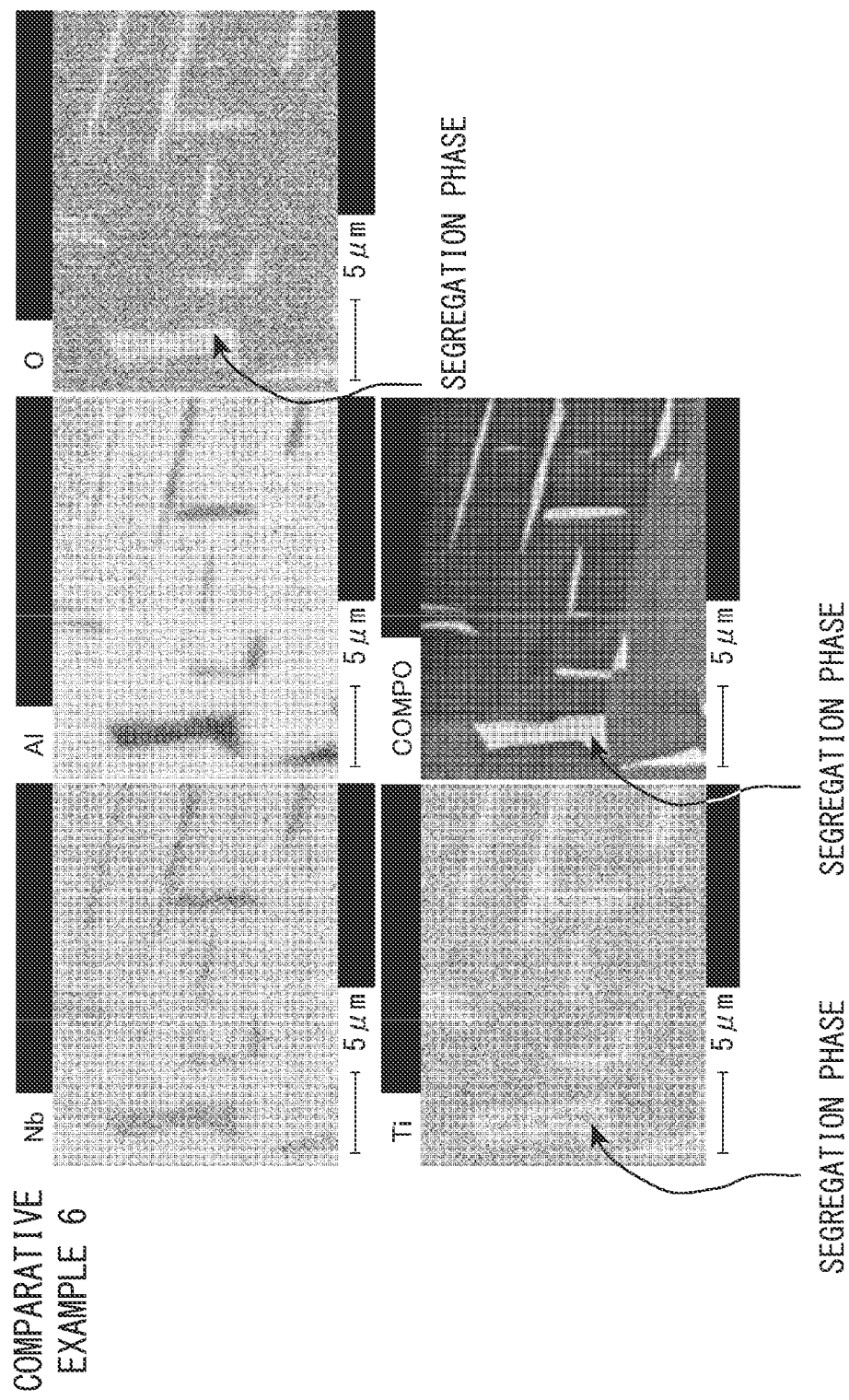
FIG. 14 presents element mapping using FE-EPMA of an SPS structural component in Comparative example 6.

For Example 6 and Comparative example 6, element mapping was conducted using FE-EPMA. FIG. 13 presents element mapping using FE-EPMA in Example 6, and FIG. 14 presents element mapping using FE-EPMA in Comparative example 6. COMPO is an SEM reflection electron composition image. As presented in FIG. 14, in Comparative example 6, coarse white phases are observed in the SEM image. This phase contains a lot of Ti and O, and is a segregation phase of Ti and O. As presented in FIG. 13, in Example 6, the segregation phase of Ti and O was not observed. As seen from the above, the addition of Y to the or greater. To reduce excessive Y, Y/O is preferably 71 or less, more preferably 40 or less, further preferably 10 or less.

In the Ni-base alloy as in Examples 1 to 4, the content of Ni is 40.0 mass % or greater, for example, 50.0 mass % or greater. In the Ni-base alloy, the O content in the alloys made by the cast & wrought method, the casting method, and the forging method is, for example, 5 ppm to 20 ppm. By contrast, the O content in the alloy powder and the O content in the structural component formed from the alloy powder are, for example, 50 ppm to 200 ppm. In the case that the content of O in the alloy is 0.002 mass % (20 ppm) or greater, the performance degrades owing to oxides compared with the alloy made by the cast & wrought method, the casting method, and the forging method. Therefore, Y is preferably added. In the case that the content of O in the alloy is 0.005 mass % (50 ppm) or greater, the performance further degrades. Therefore, Y is preferably added to the alloy. To prevent the degradation in the performance of the alloy, the content of O in the alloy is preferably 0.1 mass % (1000 ppm) or less, more preferably 0.05 mass % (500 ppm) or less.

In the case of Ni-base alloy, when the content of at least one element selected from a group consisting of Al, Ti, Cr, and Mo is 0.01 mass % or greater, the at least one element is oxidized, and the performance of the alloy thereby degrades. Therefore, Y is preferably added. In the case that the content of at least one element selected from a group consisting of Al, Ti, Cr, and Mo is 0.1 mass % or greater, the at least one element is oxidized, and the performance of the alloy further degrades. Therefore, Y is preferably added.

In the case that the Ni-base alloy contains Al, Ti, and Nb as in IN718 and IN625, the δ phase is formed, and the performance of the alloy degrades. Therefore, Y is preferably added in the case that the content of at least one element selected from a group consisting of Al and Ti in the alloy is 0.01 mass % or greater and 1.0 mass % or less, and the content of Nb is 1.0 mass % or greater and 10.0 mass % or less. In the case that the content of at least one of Al and Ti is 0.05 mass % or greater or 0.1 mass % or greater, it is more preferable to add Y. In the case that the content of Nb is 2.0 mass % or greater, it is more preferable to add Y.

In the IN718 alloy, the contents of the main elements are as listed in Table 2.
 The content of Ni is 50.0 mass % or greater and 55.0 mass % or less,
 the content of Cr is 17.0 mass % or greater and 21.0 mass % or less,
 the content of Fe is 11.0 mass % or greater and 25.0 mass % or less,
 the content of Mo is 2.8 mass % or greater and 3.3 mass % or less,
 the content of Nb is 4.75 mass % or greater and 5.50 mass % or less,
 the content of Al is 0.20 mass % or greater and 0.80 mass % or less, and
 the content of Ti is 0.65 mass % or greater and 1.15 mass % or less.

In the IN625 alloy, the contents of the main elements are as listed in Table 3.
 The content of Ni is 58.0 mass % or greater,
 the content of Cr is 20.0 mass % or greater and 23.0 mass % or less,
 the content of Mo is 8.0 mass % or greater and 10.0 mass % or less, and
 the content of Nb is 3.15 mass % or greater and 4.15 mass % or less.

As in the HASTELLOY (registered trademark) X alloy in Example 5, Y is preferably added in the case that the content of at least one of Cr and Mo in the Ni-base alloy is 1 mass % or greater. The content of at least one of Cr and Mo is more preferably 5 mass % or greater.

In the HASTELLOY (registered trademark) X alloy, the contents of the main elements are as listed in Table 4.
 The content of Ni is 41.0 mass % or greater and 54.0 mass % or less,
 the content of Cr is 20.5 mass % or greater and 23.0 mass % or less,
 the content of Mo is 8.0 mass % or greater and 10.0 mass % or less,
 the content of Fe is 17.0 mass % or greater and 20.0 mass % or less,
 the content of W is 0.2 mass % or greater and 1.0 mass % or less, and
 the content of Co is 0.5 mass % or greater and 2.5 mass % or less.

In the Ti-base alloy, the content of Ti is 50 mass % or greater, for example, 60 mass % or greater. In the TiAl alloy, the content of Ti is 30 mass % or greater, for example, 50 mass % or greater. The content of Al is 3 mass % or greater, for example, 10 mass % or greater, for example, 30 mass % or greater. In the Ti-base alloy and the TiAl alloy, the O content in the alloys made by the cast & wrought method, the casting method, and the forging method is, for example, 250 ppm to 500 ppm. By contrast, the O content in the alloy powder and the O content in the structural component formed from the alloy powder are, for example, 700 ppm to 1100 ppm. In the case that the O content in the alloy is 0.05 mass % (500 ppm) or greater, the performance degrades owing to the oxide compared with the alloy made by the cast and wrought method, the casting method, and the forging method. Thus, Y is preferably added. In the case that the O content in the alloy is 0.07 mass % (700 ppm) or greater, the performance of the alloy further degrades. Therefore, Y is preferably added to the alloy. To prevent the degradation in the performance of the alloy, the content of O in the alloy is preferably 1.0 mass % (10000 ppm) or less, more preferably 0.2 mass % (2000 ppm) or less.

In the TiAl4822 alloy, the contents of the main elements are as listed in Table 5.
 The content of Ti is 56.0 mass % or greater and 64.0 mass % or less,
 the content of Al is 33.0 mass % or greater and 35.0 mass % or less,
 the content of Cr is 2.2 mass % or greater and 2.7 mass % or less, and
 the content of Nb is 4.5 mass % or greater and 5.1 mass % or less.

Y may be added to the Ti64 alloy. In the Ti64 alloy, the contents of the main elements are as follows.
 The content of Ti is bal, 88.0 mass % or greater and 91.0 mass % or less,
 the content of Al is 5.5 mass % or greater and 6.75 mass % or less, and
 the content of V is 3.5 mass % or greater and 4.5 mass % or less.

Figure 15:
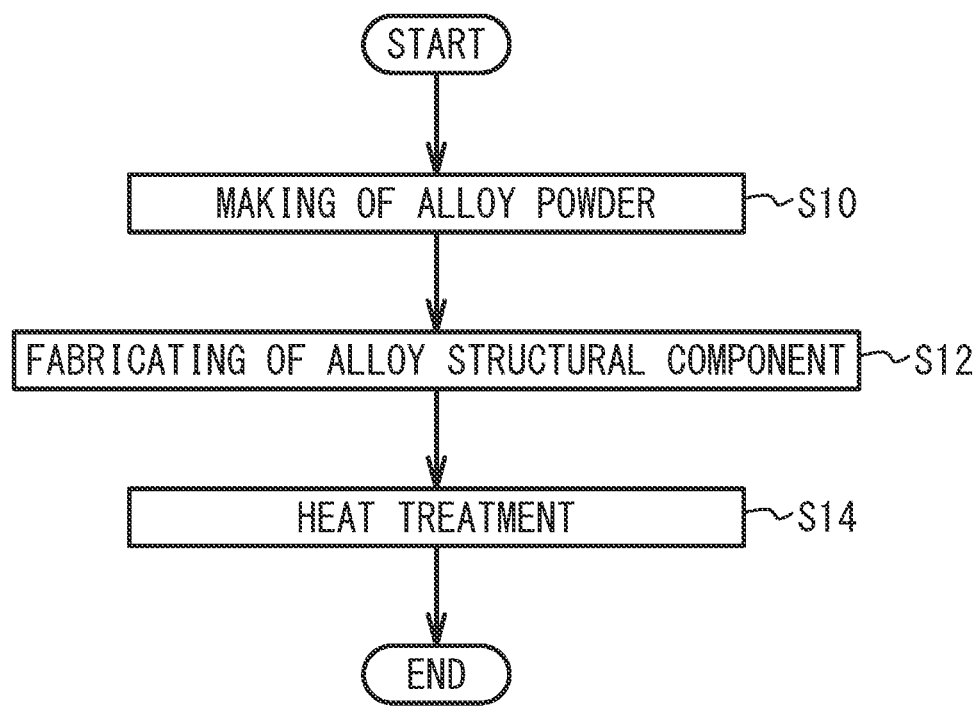
FIG. 15 illustrates a manufacturing method of a heat-resistant alloy structural component.

FIG. 15 illustrates a method of manufacturing a heat-resistant alloy structural component. As illustrated in FIG. 15, alloy powder is made first (step S10). The alloy powder is made using, for example, the atomization method. Then, an alloy structural component is fabricated by shaping the alloy powder (step S12). For example, the additive manufacturing method, the hot isostatic pressing method, the powder bed fusion method, and the direct energy deposition method can be used to fabricate the alloy structural component. Then, the structural component is subjected to heat treatment (step S14). For example, solution treatment and aging (STA) or direct aging (DA) treatment can be used as the heat treatment.

The heat-resistant alloy may be the heat-resistant alloy powder made through step S10, or may be the heat-resistant alloy structural component fabricated through steps S12 and S14.

As described above, the heat-resistant alloy of the present embodiment is useful in the fields of aircraft engines, rocket engines, industrial gas turbines, and automobile engines, etc., because of its improved high-temperature strength properties and improved oxidation resistance.

Although preferred embodiments of the present invention have been described so far, the present invention is not limited to those particular embodiments, and various changes and modifications may be made to them within the scope of the invention claimed herein.

The invention claimed is:

1. A heat-resistant alloy containing Y,
wherein a content of Ni is 58.0 mass % or greater,
wherein a content of Cr is 20.0 mass % or greater and 23.0 mass % or less,
wherein a content of Mo is 8.0 mass % or greater and 10.0 mass % or less,
wherein a content of Nb is 3.15 mass % or greater and 4.15 mass % or less,
wherein a content of O is 0.002 mass % or greater and 0.1 mass % or less, and
wherein a ratio of a content of Y in terms of mass to a content of O in terms of mass is 0.5 or greater and 100 or less.

2. The heat-resistant alloy according to claim 1,
wherein a content of Fe is 5.0 mass % or less,
wherein a content of Al is 0.4 mass % or less,
wherein a content of Ti is 0.4 mass % or less,
wherein a content of Mn is 0.5 mass % or less,
wherein a content of C is 0.1 mass % or less,
wherein a content of Si is 0.5 mass % or less,
wherein a content of Co is 1.0 mass % or less,
wherein a content of S is 0.015 mass % or less, and
wherein balance is Ni.

3. A heat-resistant alloy powder containing the heat-resistant alloy according to claim 1.

4. A heat-resistant alloy structural component containing the heat-resistant alloy according to claim 1.

5. A manufacturing method of a heat-resistant alloy structural component comprising:
forming heat-resistant alloy powder containing the heat-resistant alloy according to claim 1 using molten metal to which metal Y is added; and
forming a structural component by shaping the heat-resistant alloy powder.

* * * * *